United States Patent
Miller et al.

(10) Patent No.: US 9,710,785 B2
(45) Date of Patent: Jul. 18, 2017

(54) TRUSTED SOURCES WITH PERSONAL SUSTAINABILITY FOR AN ORGANIZATION

(75) Inventors: Garrett F. Miller, San Francisco, CA (US); Janaki P. Kumar, Palo Alto, CA (US); Jeremiah E. Stone, Palo Alto, CA (US); Michael A. Arent, Albany, CA (US); Alys M. Longworth, San Francisco, CA (US); Aaron Marcus, Berkeley, CA (US); Jennifer A. Dumpert, San Francisco, CA (US); Laurie Wigham, San Francisco, CA (US); Rebecca L. Thomas, Oakland, CA (US)

(73) Assignee: SAP SE, Walldorf (DE)

( * ) Notice: Subject to any disclaimer, the term of this patent is extended or adjusted under 35 U.S.C. 154(b) by 1145 days.

(21) Appl. No.: 13/273,973

(22) Filed: Oct. 14, 2011

(65) Prior Publication Data
US 2013/0013684 A1    Jan. 10, 2013

Related U.S. Application Data

(60) Provisional application No. 61/505,714, filed on Jul. 8, 2011.

(51) Int. Cl.
*G06F 15/16* (2006.01)
*G06Q 10/10* (2012.01)

(52) U.S. Cl.
CPC ................... *G06Q 10/10* (2013.01)

(58) Field of Classification Search
CPC ..................................................... G06Q 10/10
(Continued)

(56) References Cited

U.S. PATENT DOCUMENTS 6,061,660 A    5/2000 Eggleston et al.
7,092,898 B1   8/2006 Mattick et al.
(Continued)

FOREIGN PATENT DOCUMENTS

WO    01/86545 A2    11/2001

OTHER PUBLICATIONS

Merriam-Webster, definition of "leaderboard", retrieved from <http://www.merriam-webstercom/dictionary/leaderboard> on Jun. 20, 2013, available online Apr. 25, 2009.
(Continued)

*Primary Examiner* — Davoud Zand
(74) *Attorney, Agent, or Firm* — Jones Day

(57) ABSTRACT

A system and method for developing trust in an organization supported tracking system by ensuring that resources in a resource library are collected from trusted sources, and encouraging and tracking participation in organization supported activities designed to achieve a long term goal of the organization. Resources may be submitted by organization members and ranked according to multiple factors including the trustworthiness of the source, the relevance of the resource to the long term goal, or the response of the organization members to the resource. Participation may be encouraged through friendly competition, awards granted for participation, and publication of member accomplishments. Tracking may be facilitated by allowing members to create initiatives and actions related to the long term goal which members may follow and join and then tracking and verifying member participation in those initiatives and actions.

37 Claims, 15 Drawing Sheets

(58) Field of Classification Search
USPC .......... 709/203, 204, 206; 705/1.1, 2, 7.26, 705/7.37, 7.42, 14.1, 14.12, 14.27, 14.36, 705/14.39, 34, 35, 300, 320; 703/13; 428/8
See application file for complete search history.

(56) References Cited

U.S. PATENT DOCUMENTS

| | | | |
|---|---|---|---|
| 7,778,870 | B1 | 8/2010 | Kriza |
| 8,321,187 | B2 | 11/2012 | Kaufman et al. |
| 8,360,843 | B2 | 1/2013 | Barclay et al. |
| 9,043,319 | B1 * | 5/2015 | Burns ................. G06F 17/3064 707/706 |
| 2003/0200142 | A1 | 10/2003 | Hicks et al. |
| 2004/0043372 | A1 | 3/2004 | Jebb et al. |
| 2004/0088215 | A1 | 5/2004 | Rochelle et al. |
| 2004/0250202 | A1 | 12/2004 | Williams |
| 2005/0192852 | A1 | 9/2005 | Sorensen |
| 2006/0240856 | A1 * | 10/2006 | Counts .................... H04W 4/08 455/518 |
| 2007/0011027 | A1 | 1/2007 | Melendez |
| 2007/0100595 | A1 * | 5/2007 | Earles .................... G06Q 30/02 703/13 |
| 2008/0120384 | A1 | 5/2008 | Bryant |
| 2008/0162177 | A1 | 7/2008 | Raffel et al. |
| 2008/0255873 | A1 | 10/2008 | Berkley |
| 2008/0255979 | A1 * | 10/2008 | Slutzky et al. ................. 705/35 |
| 2009/0150178 | A1 | 6/2009 | Sutton et al. |
| 2009/0233771 | A1 * | 9/2009 | Quatrochi et al. ................. 482/9 |
| 2010/0084462 | A1 | 4/2010 | Scipioni et al. |
| 2010/0106550 | A1 | 4/2010 | Duke |
| 2011/0010230 | A1 | 1/2011 | Moreira |
| 2011/0060612 | A1 | 3/2011 | Mercer et al. |
| 2011/0145114 | A1 | 6/2011 | Purdy et al. |
| 2011/0276430 | A1 * | 11/2011 | Vyas ..................... G06Q 30/02 705/26.8 |
| 2011/0307391 | A1 | 12/2011 | Mercuri et al. |
| 2012/0041767 | A1 | 2/2012 | Hoffman et al. |
| 2014/0237053 | A1 * | 8/2014 | Abhyanker ........ G06Q 30/0261 709/204 |

OTHER PUBLICATIONS

Matthews, Richard, "Best Practices for Stainability and Communicating Stainability", available Jan. 16, 2010 at http://pledgeinforchange.com/guest-blog-posts/best-practices-for-sustainability-and-communicationg-sustainability.php, retrieved Sep. 24, 2013.

Fleischer, Deborah, "Green Teams Engaging Employees in Sustainability", published Nov. 2009, retrieved from http://www.neefusa.org/pdf/greenbiz-reports-GreenTeams.pdf on Nov. 13, 2013, total pp. 21.

* cited by examiner

Plastic Container Reuse Initiative

This initiative is about re-using all the plastic containers used in the building.

[ Become a Fan ]  [ Join ]

Overview
711

Members

- Greta Grotsch (owner)
- Sally Tae
- Alan Steves

Members
712

Photos and Videos   [ Upload New → ]

Sort by: Date  Sender  Team

Greta Grotsch photostream

| Oils | Earth day | More Earth Day | Too Darn Cute | This is us! |
| 25 July 2010 | 25 July 2010 | 2 April 2010 | 29 March 2010 | 31 Dec 2009 |
| 5 photos | 1 video | 2 photos | 1 photo | 3 photos |

Photo Album
713

Feed

What's your sustainability news?

[ Comments ] [ Activities ] [ Photo/Video ] [ All ]

Plastic Container Re-use
Sally Tae: My kids have been planting flowers in yoghurt containers. See all 15 comments.

- Sue Spollem: Doesn't water pool at the bottom?
- Sally Tae: I cut small holes in the bottom first!
- LaTeisha Jackson: New recycle bins on 9!

☑ Include comments in Feed.

Post Feed
714

Actions  Points  Faves

| Set up recycle bins | 30 | ☐ |
| Add to recycle bin | 10 | ☐ |
| Join weekly rafting | 20 | ☑ |
| Claim containers | 5 | ☑ |
| Suggest an action | 10 | |

☑ Inform me when new actions are added to this initiative.

[ Add Action to My Favorites ]

Actions
715

TRUSTED SOURCES WITH PERSONAL SUSTAINABILITY FOR AN ORGANIZATION

CROSS REFERENCE TO RELATED APPLICATIONS

This application claims the benefit of priority to previously filed U.S. provisional patent application Ser. No. 61/505,714, filed Jul. 8, 2011, entitled PERSONAL SUSTAINABILITY FOR THE ENTERPRISE. That provisional application is hereby incorporated by reference in its entirety.

BACKGROUND

Aspects of the present invention are directed to a participation tracking system and more specifically to a system for tracking individual participation in sustainability activities.

Individuals and entities are increasingly embracing the 'green' initiative by pursuing a sustainable lifestyle. Some industries are regulated and are required to report sustainability related data to a third party or government organization. Other entities voluntarily track and publish their sustainability report and carbon footprint in an effort to promote sustainability, or to otherwise benefit from a 'green' reputation. However, entities must rely heavily on their individual members to achieve their sustainability goals. For example, companies may enhance their sustainability 'score' through the conservation efforts of their employees. However, engaging members and tracking individual and group progress can often be difficult, cumbersome, and unreliable.

Individual users often express confusion and skepticism with regards to sustainability. Credible sources of sustainability information are sparse, often contradictory, and typically spread out over multiple disparate resources. Disjointed information makes personal sustainability efforts difficult to manage and track and often fails to encourage significant behavioral changes. Thus, traditional sustainability initiatives tend to result in only very minor or extremely long term benefits. Participation in such initiatives is difficult to maintain when users lack short term incentives.

Accordingly, there is a need in the art for a sustainability application that builds trust, encourages participation, and fits into an individual's lifestyle with limited disruption.

BRIEF DESCRIPTION OF THE DRAWINGS

FIG. 4(a) illustrates an exemplary interface displaying a user profile on a client device according to an embodiment of the present invention.

FIG. 7 illustrates an exemplary interface displaying an initiative on a client device according to an embodiment of the present invention.

DETAILED DESCRIPTION

A sustainability tracking system mobilizes individuals to take small actions that when combined across large groups become significant improvements in sustainability awareness and participation. The system provides the flexibility to create activities unique to the group to facilitate a sense of community. Individuals may be incentivized to use the system through the sense of community, friendly competition, public recognition of achievements, and rewards earned for adopting behavior deemed beneficial to the group. The system may build trust with the individuals through verification of self-reported activities, limiting the group members to known entities, facilitating the formation of subgroups, and restricting the information presented to information from trusted sources.

Figure 1:
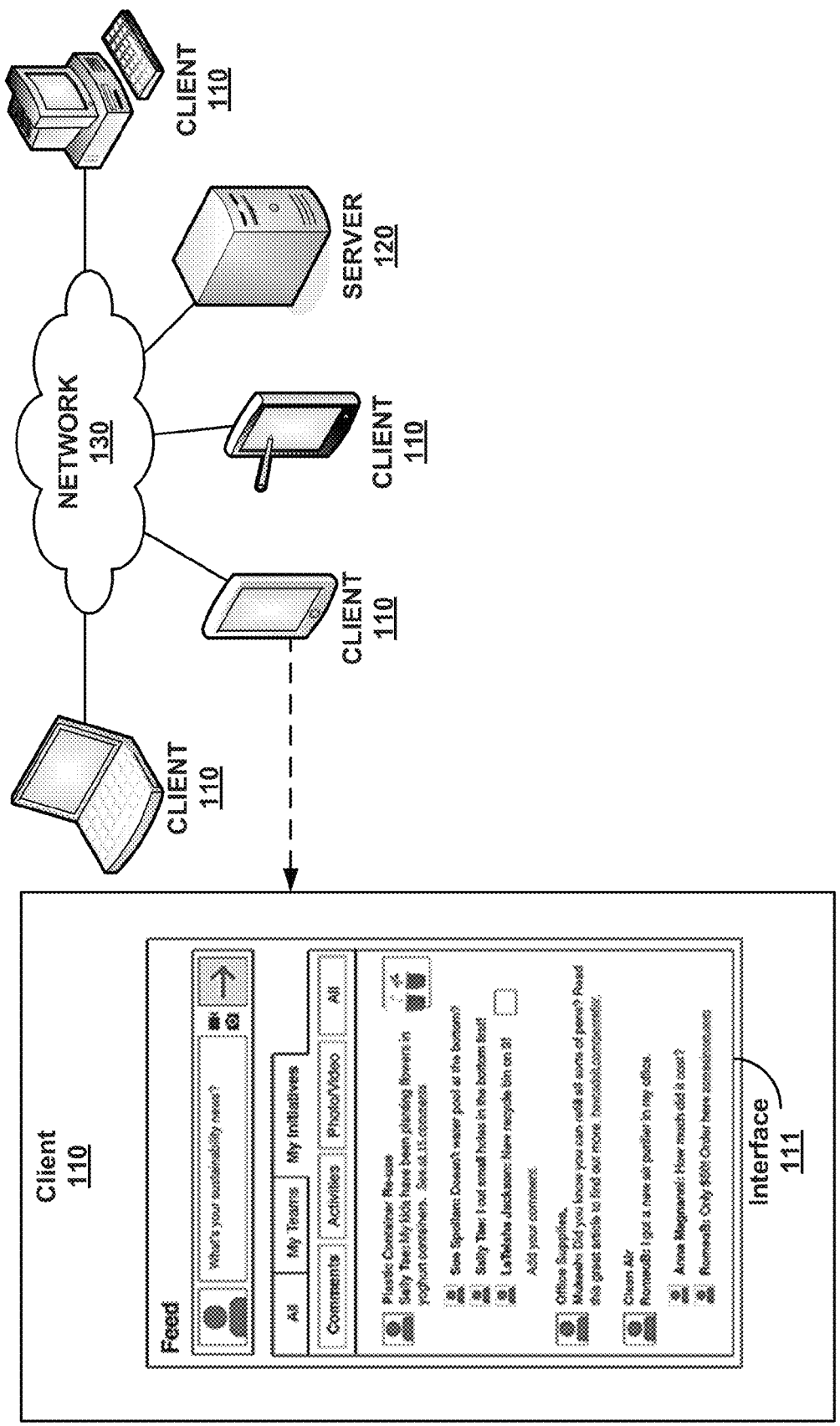
FIG. 1 is a functional block diagram illustrating components of an exemplary system according to an embodiment of the present invention.

FIG. 1 is a functional block diagram illustrating components of an exemplary system 100 according to an embodiment of the present invention. As shown in FIG. 1, the system 100 may include one or more clients 110 accessing a server 120 via a network 130. The server 120 may be a network server connected to the client 110 via the network 130. The server 120 may manage operation of a sustainability tracking system for a group, the members of the group connected to the sustainability tracking system via the clients 110. Server 120 may consist of multiple servers wherein each server performs a specific function in the system, or redundant servers that provide reliability for multiple individuals accessing multiple aspects of the system at one time. The network 130 may be a wired or wireless network that may include a local area network (LAN), a wireless area network (WAN), the Internet, or any other network available for accessing the server 120 via the client 110.

A user may access the sustainability tracking system from the client 110 via a user interface 111 capable of accessing and displaying the sustainability tracking system. The client 110 may be any computing system that facilitates a user accessing the server 120 via the user interface 111, for example a personal computer, laptop, tablet device, mobile handheld computing device, or other network enabled device. The user interface 111 may be a program or application or may comprise middleware that acts as a frontend to or otherwise facilitates access to the sustainability tracking system. The user may interact with the user interface 111 through an input device, such as by inputting a selection as with a mouse, a keyboard, or a screen tap. The user may observe the response to the selection on an output device or display of the client 110. The user interface 111 may be a system specific application or program installed on the client 110 or may be a general-purpose application, such as a web browser, capable of accessing the features of the sustainability tracking system via the network 130. The user interface may run in a browser or an application window installed on the client 110 and controlled by the user.

When the user accesses the user interface 111, the client 110 may communicate with the server 120. The server 120 may return information to the client 110 to facilitate the user's interaction with the sustainability tracking system. The user interface 111 may display one or more modules supported by a database or other data repository. Each module may be supported by one or more databases accessible by the server 120.

Figure 2:
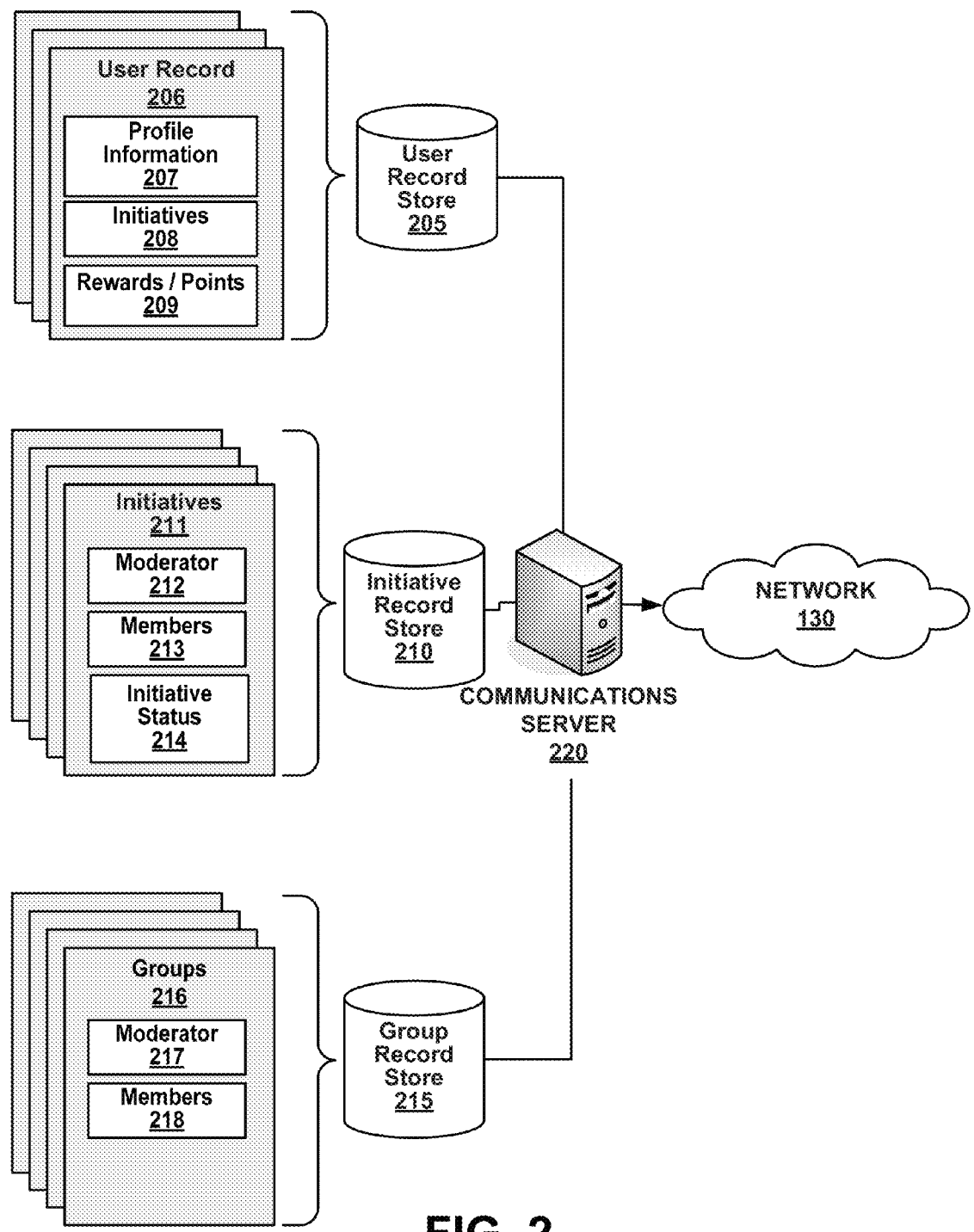
FIG. 2 illustrates an exemplary database support system according to an embodiment of the present invention.

FIG. 2 illustrates an exemplary database support system 200 according to an embodiment of the present invention. As shown in FIG. 2, communications server 220 may be connected to a user record store 205, a group record store 215, and an initiative record store 210. Each store may be a database, repository, or other memory storage device for organizing, managing and facilitating access to sustainability tracking system records. According to an embodiment, records in one or more databases may be accessed via a single server, or the communication of data from each database may be managed by a separate server (not shown).

Figure 3:
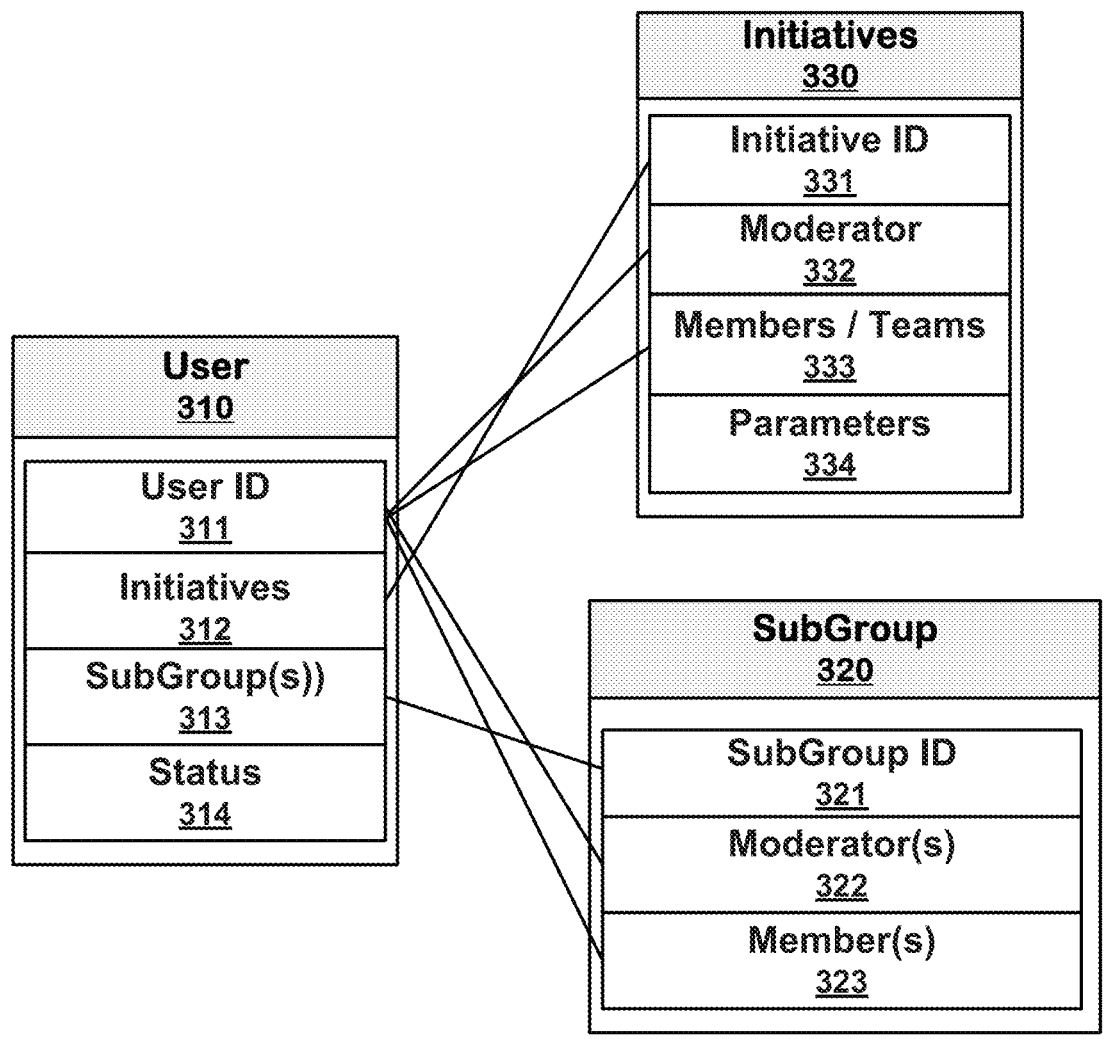
FIG. 3 illustrates exemplary records for sustainability tracking information according to an embodiment of the present invention.

FIG. 3 illustrates exemplary records for sustainability tracking information according to an embodiment of the present invention. As shown, a user record 310 may store information for individual users of the sustainability tracking system. Each user record 310 may include profile information, such as user name or ID 311 and contact information. A user record 310 may include pointers to the subgroups 313, teams, competitions, and initiatives 312 to which the user has been invited or has otherwise indicated a desire to participate in or follow. A user record 310 may additionally identify the points or rewards status 314 the user has accumulated using the sustainability tracking system as well as any goal related information. For example, a goal may be set by the user and the status 314 may indicate the points needed to achieve that goal. A user record 310 may contain other information not listed, for example a user record 310 may include information regarding past goals accomplished or other profile information such as the level of activity the has had to date or any negative feedback or disciplinary actions taken by the system administrators against the user.

A subgroup record 320 may include a unique subgroup ID 321 and pointers to the user that acts as moderator for this subgroup 322 as well as pointers to the user records for the users that are members of the subgroup 323. A subgroup record 320 may contain other information not listed, for example the competitions the subgroup has participated in or the feature that brought the members together as a subgroup.

An initiative record 330 may include a unique initiative ID 331 and a set of parameters defined for the initiative 334. The initiative record 330 may additionally include pointers to the user that acts as moderator for this initiative 332 and the users, teams, or subgroups that are participating in the initiative 333. Parameters 334 may include a start time, a time limit, or a budget for initiative, a maximum or minimum required number of participants, a geographical limitation on the participants, or any other information necessary to define the initiative. An initiative record 330 may contain other information not listed, for example the actions that an initiative member can take to earn points and to support the initiative or ratings of the initiative submitted by the participants.

Each user record 310 may be associated with a single user of the sustainability tracking system. The sustainability tracking system may service a single group, such as a single corporation or community organization, or multiple related groups, such as multiple churches of a single denomination or multiple businesses sharing a building or an office park. Members of a group may have access to only those aspects of the sustainability tracking system that are associated with the group. Therefore, a group member may have the ability to compete only in those competitions, or participate only in those initiatives organized for their associated group, regardless of the number of groups supported by the sustainability tracking system. However, a system user may be invited into more than one group.

In accordance with an embodiment of the present invention, a group may be closed such that no new members may be invited into to the group without the approval of the group moderator or owner. In accordance with another embodiment, a group may be open such that any current member may invite other individuals to join the group. Membership may then be limited to invited persons or groups to ensure that only trustworthy members can participate and receive the rewards of participation. For example, a corporation may invite employees, suppliers, customers, etc. to join their sponsored group whereas an individual member may invite a trusted friend or family member to participate in group activities and competitions. Then, individuals trusted by at least one member of the group may be added to the group and participate in sustainability tracking system activities. Members invited by other members may or may not be eligible to participate in the rewards program for the group. An individual may additionally request membership in a group if not otherwise invited by the group administrators.

Members may additionally form subgroups. Subgroups may consist of users who have self-identified as having common interests, may be formed automatically by the system based on profile information or the users, or may be organized by a system moderator, administrator or owner. A subgroup may be a team whose members participate in sustainability tracking system activities together, for example, the human resource department or the members of a specific building.

FIG. 4(*a*) illustrates an exemplary interface 411 displaying a user profile and other related information on a client device according to an embodiment of the present invention. As shown in FIG. 4(*a*), a user profile interface 411 may display a general profile module 412 that identifies the user and displays information about the user, for example contact information and a brief biography of the user. The profile information may be collected and automatically displayed by the system or may be entered by the individual user, the group owner or moderator, or another user. A photo album module 413 may include photos, videos, or other images added by the user, added by others but in which the user is featured, or marked as interesting by the user. An initiatives module 414 may provide identification of the initiatives the user is participating in or following. The initiatives module 414 may additionally provide links to an interface for each of the initiatives currently associated with the user, or links to browse, explore or add a new initiative to the initiatives module 414. A teams module 415 may include identification and links to an interface for each team with which the user is associated. A competitions module 416 may include identification or links to an interface for each competition in which the user is participating or following.

A post feed module 417 may display news, comments and messages. The news, comments, and messages may be related to the user's activities, competitions, teams, groups or initiatives, directed to or posted by the user, or directed to or posted by other users that the user follows. The posts displayed in the post feed module 417 may be regularly updated or updated whenever a new post is available. The post feed module 417 may additionally provide links to other feeds including activities the user, the related teams, or the group as a whole are participating in, to a feed of photos and videos uploaded by members of the user's teams, competitions, initiatives, or the group generally, or to all the posts, comments, activities, photos and videos from the post feed module 417 displayed in a single interface. An individual user's post feed may be viewed by other users. The user may have access to security settings that determine privacy features and outside access to user profile information including the post feed. The privacy settings may identify the subgroups or group members that have access to the user's profile or post feed, for example, the user may limit access to only members the user is following, only members in the user's team, only members in one or more of the user's subgroups, etc.

A post feed module 417 may additionally include an update interface 419 that provides an interface for the user to add new comments or photos to their profile. A comment may be a message concerning a topic of interest for the user, for example an idea for a new initiative, a statement initiating a discussion on a current event, a link to interesting articles, items, or websites, or announcement indicating completion of an activity or an acquisition of reward points. Each post or comment may be included in a greater collection of group comments, may be included in a group post feed, and may be parsed for information relevant to the group as a whole. Pictures and weblinks, for example, may be added to the collection of resources created for the group. Culling resources from the posts and comments of group members ensures that the source of the resource is a trusted user.

A success tracker module 418 may display the user's accumulated points, whether a lifetime accumulation, or an accumulation over a designated and limited period of time (such as quarterly or annually), and the user status achieved based on the accumulated points. The sustainability tracking system may maintain a virtual economy that has a point system or other method of tracking a social currency for managing rewards and determining the status of each user. Points may be awarded for a variety of reasons, for example, participating in an initiative, winning a competition, submitting a resource, or getting new members to join or to participate in system activities.

Figure 4A:
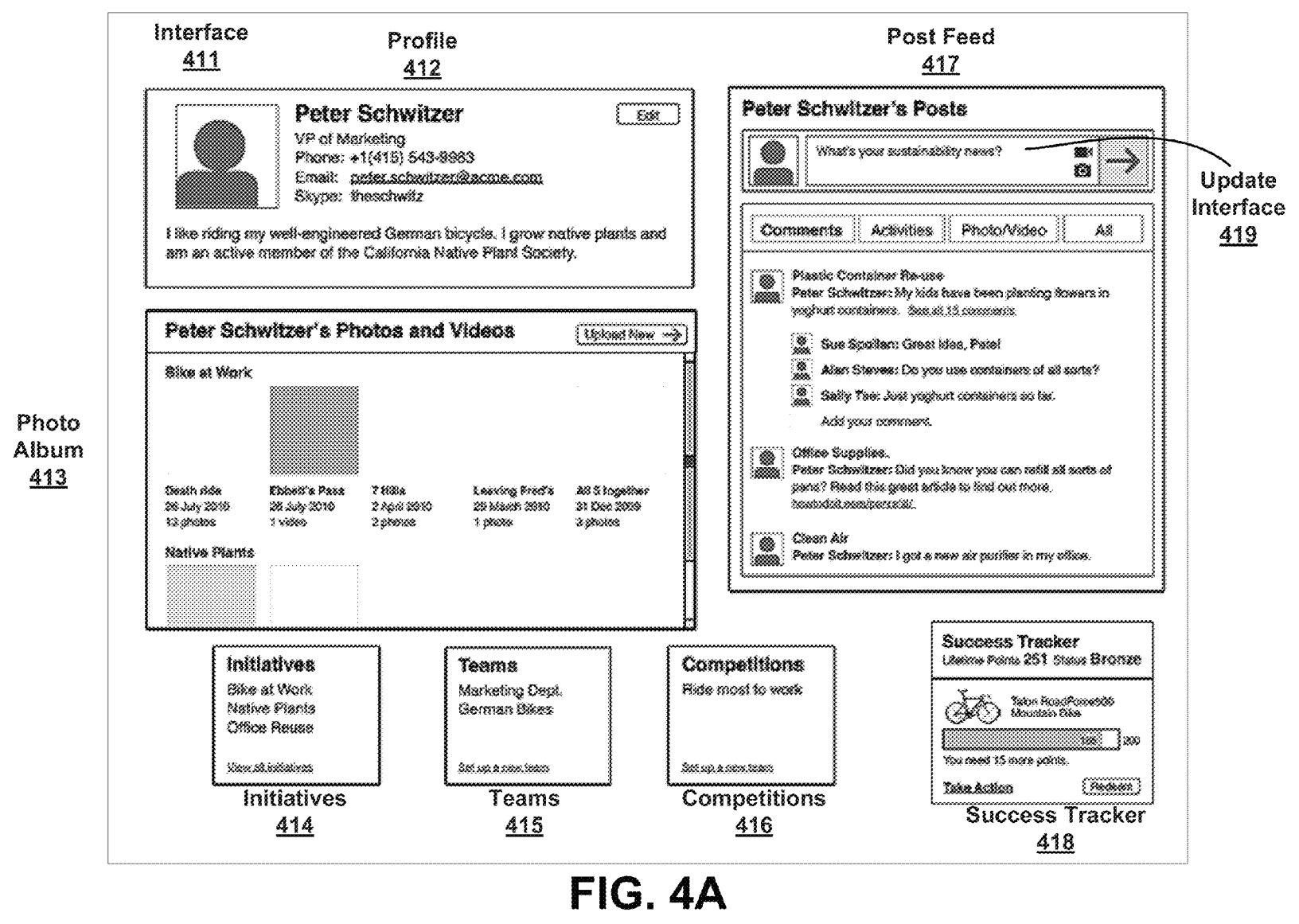

As will be further described below, the sustainability tracking system may provide users the option to set goals for point accumulation that may be achieved by participating in sponsored activities and initiatives. Upon reaching a set goal, a user may then redeem their accumulated points for rewards. As shown in FIG. 4(a), the success tracker module 418 may provide links to an interface for redeeming accumulated points, or to an interface that identifies system activities, participation in which will allow the user to earn additional points.

Some user record elements may not be accessible to the user and therefore not displayed on the profile interface, for example, a unique identifier used by the sustainability tracking system to identify the user record throughout the system. Other profile elements may be visible by selecting an interface to view the record. For example, the user may not initially see the feed listing the posts the user has contributed to or is following until the user selects the comments or activities tab of the displayed post feed module 417.

Figure 4B:
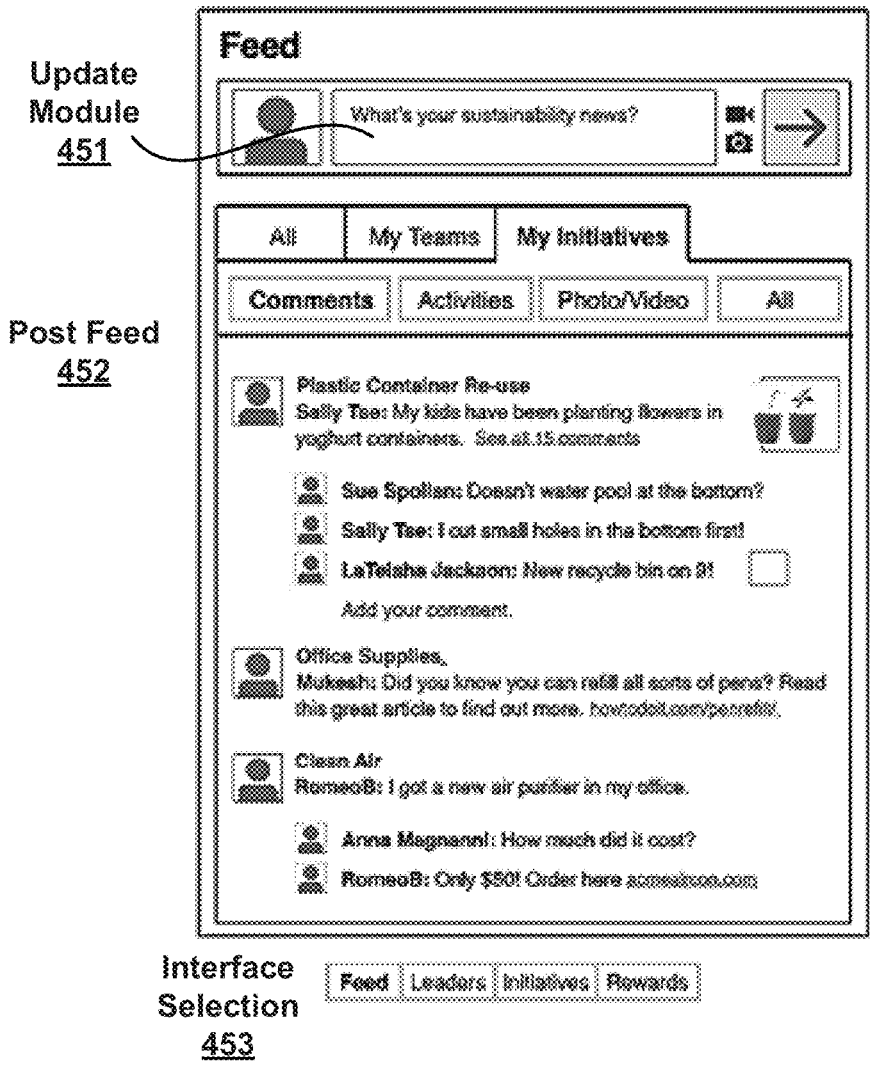
FIG. 4(b) illustrates an exemplary interface displaying a user profile on a mobile client device according to an embodiment of the present invention.

FIG. 4(b) illustrates an exemplary interface displaying a user profile and other related information on a mobile client device according to an embodiment of the present invention. As shown in FIG. 4(b), a mobile interface 450 may display a subset of the elements displayed in the user profile interface 411. For example, the mobile interface 450 may display an update module 451 that provides an interface for the user to add new comments or photos to their profile or post feed. A post feed module 452 may display the user's news, comments and messages. The news, comments and messages may be related to the user's activities, competitions, groups, teams or initiatives, directed to or posted by the user, or directed to or posted by other users that the user follows. The post feed module 452 may additionally provide links to other feeds including activities the user, the related teams, or the group are participating in, a feed of photos and videos uploaded by members of the user's teams, competitions, initiatives, or groups, or to all the posts, comments, activities, photos and videos from the post feed module 452 displayed in a single interface window.

A mobile interface 450 may additionally provide links to display other interfaces 453, for example, there may be links to display the available initiatives or the initiatives the user is following, to display the group or team leaderboard indicating which group members have accumulated the most points, to display the user's success tracker or the rewards available for achieving a goal, or to return to the user's post feed module.

A mobile interface 450 may facilitate efficient use of the sustainability tracking system. For example, a user may view actions within their initiatives for which participation will award them points, notify the initiative moderator that they have completed an action, upload photos or comments to illustrate their completion of an action, rate the action or initiative, and add the action to their post feed all via a mobile client device, thereby allowing users to interact with the sustainability tracking system while on the go, away from their computer or traditional client device, or in real time, while engaged in sustainability tracking system activities.

Figure 5:
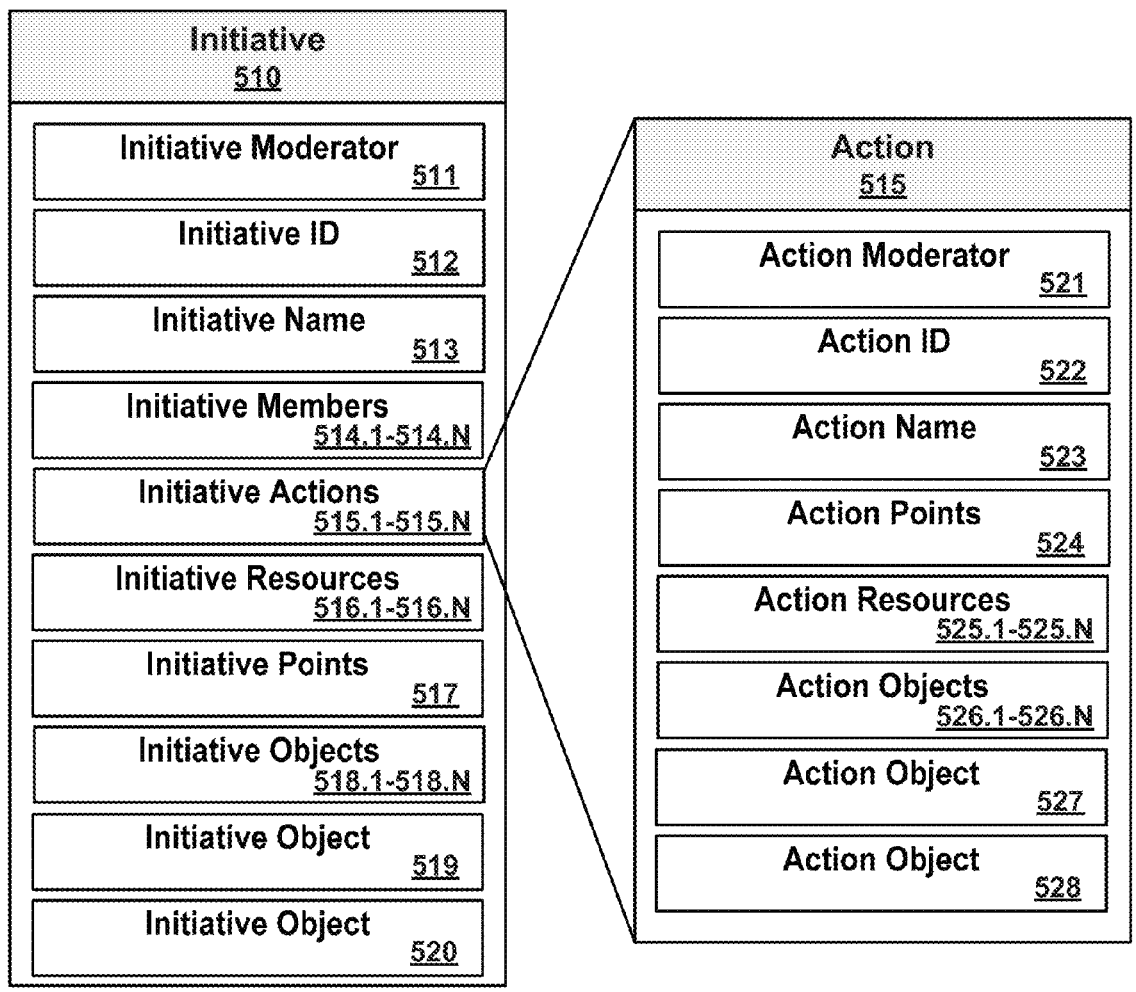
FIG. 5 illustrates an exemplary record for an initiative according to an embodiment of the present invention.

An initiative is an organizational tool for encouraging activity related to a specific goal or topic within the sustainability tracking system. FIG. 5 illustrates an exemplary record for an initiative 510 in the sustainability tracking system according to an embodiment of the present invention. Each initiative may have one or more moderators who are responsible for creating and maintaining the initiative. Accordingly, the initiative record 510 may include pointers to the user record for one or more users designates as initiative moderators 511. The initiative creator may be the default initiative moderator or an individual within the group responsible for group administration may be designated as the default moderator. An initiative creator or moderator may additionally assign another user or initiative member as the initiative moderator 511. An initiative record 510 may additionally include an initiative ID 512 which may be assigned by the system as a unique identifier that identifies the initiative in the system and an initiative name 513, which identifies the initiative to the system users and may be descriptive of the initiative. The initiative name 513 may be created by the initiative moderator 511 during creation of the initiative or may be edited by the initiative moderator 511 at a later time.

The initiative record may additionally include pointers 514.1-514.N identifying system users that have indicated an interest in following or participating in the initiative. A new pointer 514 may be created when a new user indicates a desire to follow or join the initiative. The initiative moderator 511 may have the option to regulate membership, either by setting a limit to the number of members that can participate in the initiative, or by refusing membership to individual system users. Membership might be refused for example, if the initiative is only applicable to users at a specific location.

An initiative record 510 may also contain pointers to one or more actions 515.1-515.N. Actions may be activities or events related to the initiative in which members might participate. As shown, an action record 515 may include an action moderator 521. The action moderator 521 may or may not be the same member as the designated initiative moderator 511. Actions may be created by the initiative creator or initiative moderator 511, by any member of the initiative, or by a user having administrative or initiative creation privileges. Actions may also be suggested or created by any system user and adopted or accepted by the initiative moderator 511. The initiative moderator may additionally have the ability to delete, remove, or otherwise alter the initiative and related aspects. For example, an initiative moderator 511 may delete or remove association of a resource with the initiative, or may approve or delete actions. In some embodiments, an initiative moderator 511 may need approval or permission from a group administrator to significantly change the initiative, for example, to delete an action or initiative. Additionally, initiative changes may require group administrator approval if the affected initiative or action has actively participating members.

The group administrator may have privileges that allow the administrator to set initiative and system parameters. For example, the group administrator may set default parameters and settings that may then be applied to all initiatives in the group. In some embodiments, the group administrator may set parameters for individual initiatives. Parameters may be set when the administrator approves a new initiative or after the initiative has been created. The group administrator may additionally set parameter defaults for a group or a category of initiative, for example, new initiatives or initiatives created by a specific category of user. Exemplary parameters that may be set by a group administrator may include the total or maximum points available for an initiative or action, the types of resources displayed or collected in an interface module, etc.

An action record 515 may also include an action name 523 and an action reward which may include a number of points awarded for participation in the action 524, each of which may be set by the action moderator 521 at the time of action creation. In some embodiments, these aspects of the action record 515 may be revised at a subsequent date. The action ID 522 may be a unique identifier assigned by the sustainability tracking system and used to identify the action within the system. As with the initiative, an action may be associated with one or more resources 525.1-525.N, and optional objects 526-528 that allow the action moderator 521 the flexibility to define unique aspects of the action.

An action record 515 may contain other information not listed, for example each action may have one or more ratings or reviews of the action as submitted by action participants. Action ratings may be used to identify popular actions or to identify actions that require additional moderator oversight to maintain the quality of group initiatives. An action record 515 may additionally include a list of pointers indentifying system users that have participated in or completed the action.

An initiative record 510 may include pointers to one or more associated resources 516.1-516.N. A resource 516 may be any media associated with the initiative, for example, photos and videos, informative articles, links to relevant products, etc. A resource 516 may be associated with the initiative by the initiative moderator 511 when creating the initiative, by a member 514 in an initiative related comment or post, or automatically by the sustainability tracking system. The sustainability tracking system may automatically associate a resource 516 with an initiative based on keywords or user rankings or other relevance parameters.

An initiative record 515 may include an identification of an initiative reward 514 or initiative points 517. An initiative member may be awarded participation points or other rewards for participation in the initiative or completion of an initiative related action. However, the number of points participants in an initiative that may be awarded may be limited. Then the initiative points 517 may include a record of the remaining points the initiative may award. The initiative moderator 511 may assign a number of points to each action, and then an initiative member 514 that participates in the action may receive the assigned action points 524. In accordance with an embodiment, the total available initiative points 517 may be periodically refreshed. For example, every month or every quarter, the total available initiative points may be restored or new awards made available. Additionally, in accordance with an embodiment, the initiative moderator 511 may request additional points. A group administrator may approve, or the system may automatically approve the disbursement of additional initiative points to the initiative record 510.

Each initiative may have predefined features that an initiative creator is required to identify or that the system automatically populates, as well as a plurality of optional features that may be created or defined by the initiative creator or moderator 511. The optional features may be generic objects initialized by the initiative creator or moderator 511 that provide the flexibility to create the initiative according to the initiative creator or moderator's 511 design. For example, optional objects 518.1-518N may include pointers to one or more subgroups or teams competing in the initiative or optional objects 519-520 may identify the score achieved by individuals or teams participating in the initiative. Optional objects may allow for easy and efficient initiative extensibility.

An initiative may be created by third parties and prepackaged or may be created by a system user. Permission to create a new initiative or action may be restricted to only a few users with administrative privileges within the group, may be open to all members of the group, or may be a reward granted to members who are active in the group, for example, members at the top of the group leaderboard or members that have reached a certain status based on their accumulated point totals.

Figure 6:
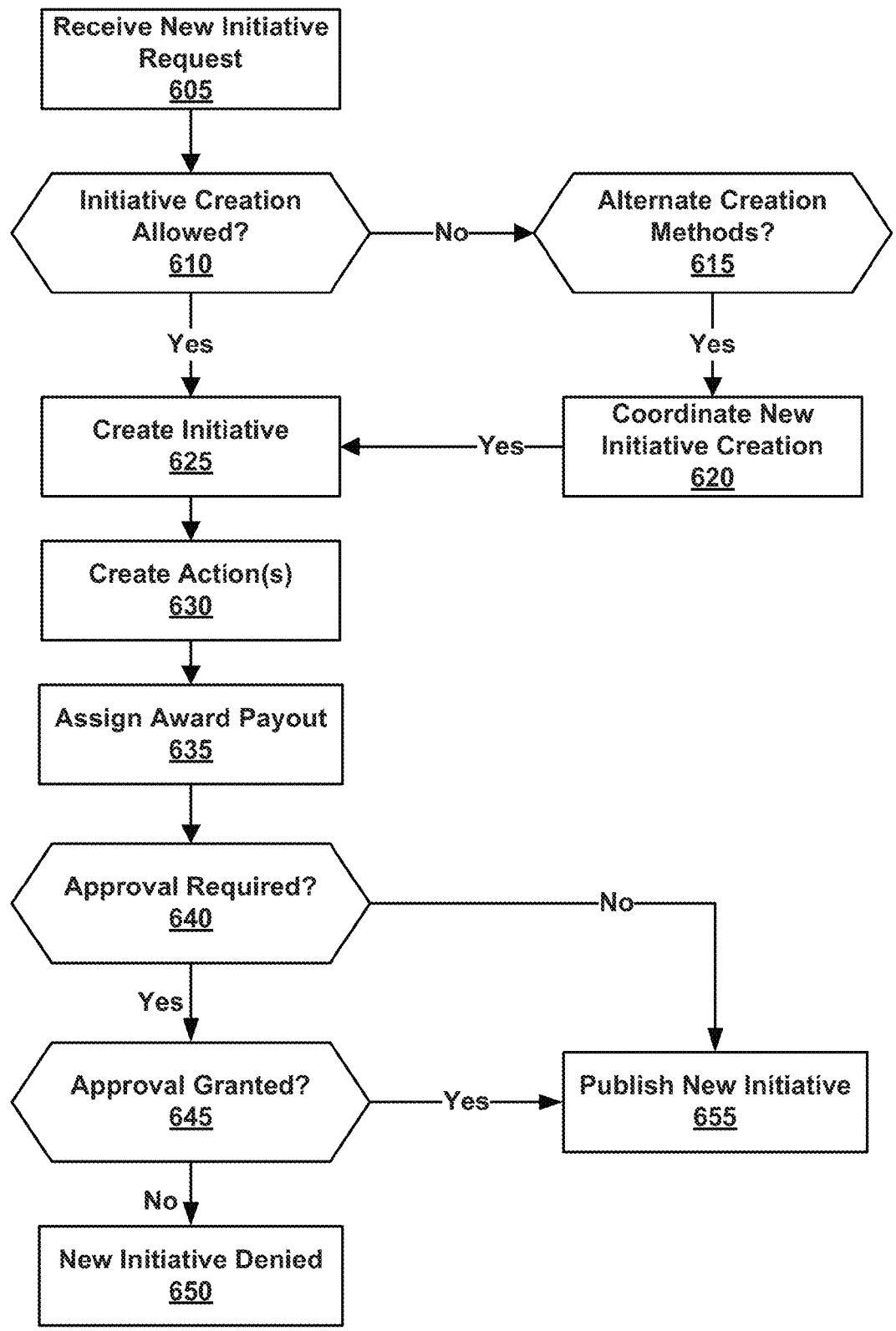
FIG. 6 illustrates an exemplary method for creating an initiative according to an embodiment of the present invention.

FIG. 6 illustrates an exemplary method 600 for creating an initiative according to an embodiment of the present invention. Initially, the system may receive a request from a system user to create a new initiative (block 605). If the user does not have permission to create a new initiative (block 610) the system may deny the new initiative request. If the request is denied, an alternate creation method may be available (block 615). An alternative method of initiative creation may be coordinated by the system (block 620). For example, the system may allow the user to create the new initiative but require review and approval by a group or system administrator before the new initiative is activated. Or, the user may provide details for the new initiative and submit the initiative idea. Then an initiative administrator or other user with permission to create new initiatives may create a new initiative to implement the ideas outlined in the new initiative submission.

If the user does have permission to create a new initiative (block 610), the system may facilitate the creation of a user may create a new initiative record with details sufficient to instantiate the new initiative (block 625). These details may include the required elements of an initiative record or otherwise include sufficient information for the system and system users to identify and utilize the new initiative. For example, an initiative moderator and name, one or more initiative related resources, or one or more initiative unique objects may be defined upon creation of an initiative. One or more actions or events may additionally be created to provide initiative members with participation opportunities (block 630).

Once an initiative is created, the initiative creator may assign reward payouts which may be in the form of a points award for completing the action (block 635). Point awards may be set for each activity or action in which a member may participate. For example, a set number of points may be awarded for each member that participates in a defined action and additional points may be awarded for verification that the member participated in the action. Additionally, for competition based actions, a point scale may be set to compensate the competition winners for their success. The initiative creator may be restricted in setting the point awards if, for example, the initiative has a limited number of points to award or if the group has set a maximum award limit for all initiatives and actions or for some initiatives and actions that fall into a predetermined category, for example, new initiatives, user created initiatives, or un-approved initiatives.

Some actions may be added to each new initiative by default, unless removed by the initiative moderator. For example, every initiative may include an action that rewards the submission of an initiative related resource, or for recommending the initiative to another user that joins the initiative.

A new initiative may need approval of a system administrator upon completion (block 640). If approval is required and approval is not granted (block 645) the new initiative may be denied, may be purged form the system, may be revised by the initiative moderator to attempt to gain approval, or may otherwise await further action (block 650). If approval is required for the new initiative and approval is granted (block 645), or if approval is not required for the new initiative (block 640), then the new initiative may be activated and published (block 655). Publication may include providing details about the new initiative in a group-wide or system notification, for example, in an update message delivered to system users. An update message may be a notification message transmitted to system users either via a periodic update email, a message presented in a post in the group users' post feeds, or other notification message. Publication may additionally include an update on the system homepage or otherwise spotlighting the initiative in a general access page or system home page. A completed and published initiative may then begin receiving membership requests.

An initiative may be designed for participation by a single member or a team of members. For single member initiatives, each time a member participates in an action, that member may receive an award of points as previously designated by the initiative creator or moderator. For team initiatives, each member that participates in a team activity may be rewarded, or only a subset of the participants may be rewarded. Similarly, initiative actions may be designed for participation by a single member or a team, with a static total point award for each action completed dispersed among the action participants. For competitions, the points awarded for the completion of the action may be distributed according to the results of the competition. The points may be awarded to all of the participating members or teams on a sliding scale such that the participant that wins the competition is awarded more points than the other participants. Alternatively, the points may be awarded to a subset of the participants at the top of the competition results. The point or award disbursement may be determined by the action or initiative moderator.

FIG. 7 illustrates an exemplary interface 700 displaying an initiative on a client device according to an embodiment of the present invention. As shown in FIG. 7, an initiative interface 700 may display an overview module 711 that identifies the initiative and provides a brief description or introduction of the initiative. The overview module 711 may provide links to an interface through which a user may indicate an interest in the initiative or become a member of the initiative. A user can follow (or become a fan of) an initiative without becoming a member to receive news and information updates, for example, the feed posts associated with the initiative, or updates about new or upcoming actions or competitions associated with the initiative.

An initiative interface 700 may additionally include a member module 712 that has a list of recently added, recently participating, or active members. For each member in the list, the member module 712 may provide a link to a profile interface such that members or users interested in the initiative may identify and learn about members with similar interests. An initiative interface 700 may further include a photo album module 713. The photo album module 713 may include photos, images and videos added by initiative members, or photos, images and videos added by other users but that are relevant to the initiative. The photos, images, and videos displayed in the photo album module 713 may be limited to items collected by members during participation in or completion of an initiative activity or action.

Alternatively, the items displayed in the photo album module 713 may be limited items collected during participation in a team or subgroup based initiative activity or action. The limits on the items included in the photo album module 713 may be set by the initiative creator or moderator, may be set to systems defaults, or may be set by the group administrator. The photo album module 713 may additionally include an update module or a link to an interface that facilitates upload of photos, videos, and other images by an initiative member or other system user to the photo album collection of objects.

An actions module 715 may provide identification of the actions associated with the initiative. The actions module 715 may additionally provide links to an interface for each of the actions currently associated with the user, or to add the actions to the member's action list.

A post feed module 714 may display news, comments and other items posted by initiative members and related to the initiative. The news and comments may be related to the initiative actions, competitions, teams or the initiative generally, posted by initiative members. The post feed module 714 may additionally provide links to other feeds including a specific post feed of comments posted by initiative members, or to all the posts, comments, actions, resources, photos and videos related to the initiative displayed in a single interface window.

A post feed module 714 may additionally include an update module that provides an interface for the initiative members to add new comments or photos to the initiative post feed. A comment may be a topic of interest related to the initiative, for example an idea for a new action, a discussion on a current event, or links to interesting articles or items. Photos uploaded via the post feed module 714 may be extracted and added to the photo album module 713.

Referring back to FIG. 5, some initiative record elements may not be accessible to the users and therefore not displayed on the initiative interface 700, for example, the unique identifier 512 used by the sustainability tracking system to identify the initiative record 510 throughout the system or the total points available 517 for allocation to initiative participants.

Figures 8A, 8B:
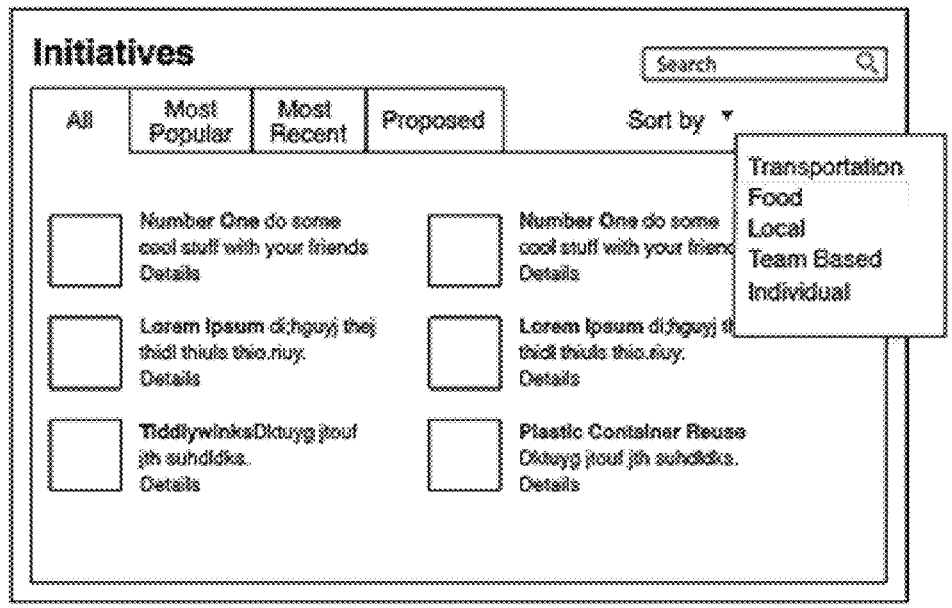
FIG. 8(a) illustrates an exemplary search interface as displayed on a client device according to an embodiment of the present invention.
FIG. 8(b) illustrates an exemplary take action interface as displayed on a client device according to an embodiment of the present invention.

Sustainability tracking system users may have the ability to browse available initiatives through a search interface according to an embodiment of the present invention. FIG. 8(*a*) illustrates an exemplary search interface 800 as displayed on a client device. As shown in FIG. 8(*a*), a search interface 800 may display all available initiatives or actions and provide a module for sorting the initiatives and actions to facilitate identification of initiatives according to the user's preferences. The search interface 800 may additionally provide links to other interfaces that display a limited set of available initiatives, for example, the most popular initiatives, the most recently added or updated initiatives, or the initiatives pending group administrator approval. With location-based services, a user may additionally search for local initiatives or actions taking place in the vicinity of the user. Local initiatives and actions may be displayed on a list or map to indicate a location for participation in the initiative or action.

Sustainability tracking system users may have the ability to submit notification of participation in an initiative action through a take-action interface. FIG. 8(*b*) illustrates an exemplary take-action interface 810 as displayed on a client device. As shown in FIG. 8(*b*), a take-action interface 810 may display the actions in which the user may participate. The available actions may include open-ended actions which are not restricted by a time limit, actions that are starting in the vicinity in the near future, and any other actions that are available for any initiative in which the user is a member. A user may access the take-action interface 810 via a link in another interface, for example, from the user interface or the success tracker module. Accessing the take action interface 810 directly from an initiative interface may limit the list of available actions displayed to those actions related to the original initiative. From the list of available actions, the user may select an action in which the user is or has participated in. The selection of an action may provide access to a post interface through which the user may submit participation evidence and publish the action participation to a feed post. When an action is successfully completed, the points awarded for the action may be credited or distributed to the user.

The sustainability tracking system may automatically distribute the appropriate participation points to the member or may first require verification and approval. Verification may include approval by an administrator or moderator, submission of a verifying post by a second user, or submission of a resource that evidences the user's participation in the action. An exemplary evidentiary post or resource may include a photo of the user participating in the action, a comment from a user congratulating the member on a successful action, or a submission of recent GPS activity as recorded on the member's mobile client indicating the member's movements or position during event participation. In accordance with an embodiment, a user or a moderator may submit the names of individual members who have successfully completed an action and request the appropriate point distribution. Other conditions may additionally affect the award of points. For example, if the member has already completed the action once, the member may be restricted from completing the action a second time or may receive fewer points for subsequent participation in the same action.

Initiatives are designed to be flexible and encompass a variety of different activities and actions. Several exemplary initiatives are described below, each initiative illustrating an exemplary initiative directive or goal and the types of activities an initiative may organize. Although exemplary initiatives are described herein, the sustainability tracking system is designed to provide the flexibility to allow system users to define and design their own initiatives, limited only by their own creativity. The provided examples should be considered only exemplary and not limiting embodiments of an initiative.

Bike to Work

A neighborhood bike to work initiative may be created for people who live in or near a particular area and from which they may bike to work. The initiative may be created so that members from the neighborhood can leave their homes at approximately the same time and bike along the safest route, as suggested by the initiative moderator. Other members can join the group anywhere along the designated safe route. The positive reinforcement of a group activity as well as the additional points awarded for each day biked may encourage members to bike to work more often.

Another initiative member that is good at fixing bikes, for example adjusting brakes, balancing gears, and making sure the tires are optimally filled may add a date sensitive action to the actions list for the bike to work initiative. The new action may offer a bike tuning session to be conducted at a predetermined time and place in the near future. The action creator may receive bonus points for creating and organizing the action and may have the responsibility to monitor and report attendance. Verified attendees may then be awarded points. If an initiative member submits an action completion notification, the member may be awarded participation points. If the member is then also identified in the verified attendance list, additional points may be awarded. A verified participant may not submit a participation notification but may still be awarded participation points.

An initiative member using a mobile client may access the initiative interface from a mobile device. From the list of actions available for the initiative, the member may view additional actions that can be taken to earn points, for example in the bike to work initiative, an action of biking among buildings may be listed and may inspire the member to bike to his next meeting. The action may award additional points for uploading a photo, so for example, the member may upload a picture of their bike leaning against the sign for a first building and a second sign for a second building. Then the member may post his action completion notification. Notification that the member has performed the action will go to the initiative moderator for approval and the disbursement of award points to the member as required.

Vampire Hunters

Another exemplary initiative is a vampire hunters game. A "vampire" is an identified power drain, or item that is unnecessarily using energy, for example, a rarely used device that is left powered on or plugged in to an adapter that has a continuous power draw. In the vampire hunters initiative, individuals or team members identify locations of vampire power drains throughout a predetermined area, for example a single building or the local campus. The goal is to find and document the most examples of vampires within the designated location, for example phone chargers, lights, video screens, and computers not being used but left on. The power draining items and locations may be entered into a database or otherwise tracked. From the collected power drain locations, the sustainability tracking system may estimate the total power wasted by the identified vampire, map the location of all of the vampires or just the worst offenders, or produce a graph or other visualization of the levels of wasted power. The resulting visualization, whether a map, diagram, or table may then be available to all group members. When a vampire has been eliminated, the visualization could be updated to show changes as methods for saving energy and draining less power are implemented. Additionally the list of identified vampires may be utilized by facilities or maintenance to install more energy efficient devices in those locations.

Figure 9B:
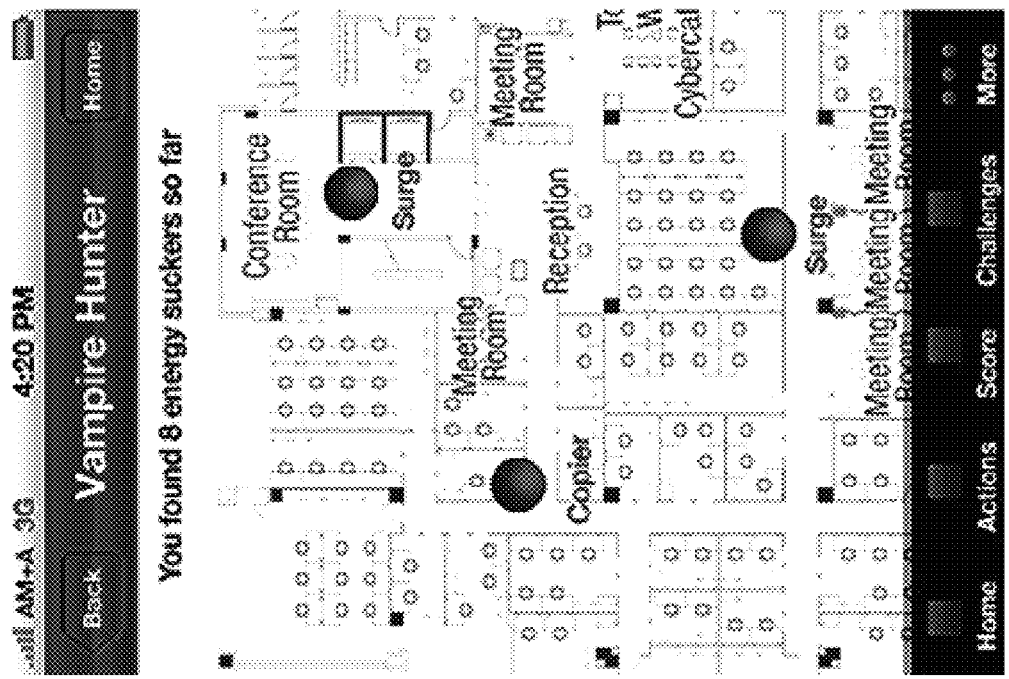
FIGS. 9(a)-9(d) illustrate exemplary initiative interfaces according to an embodiment of the present invention.
Figure 9A:
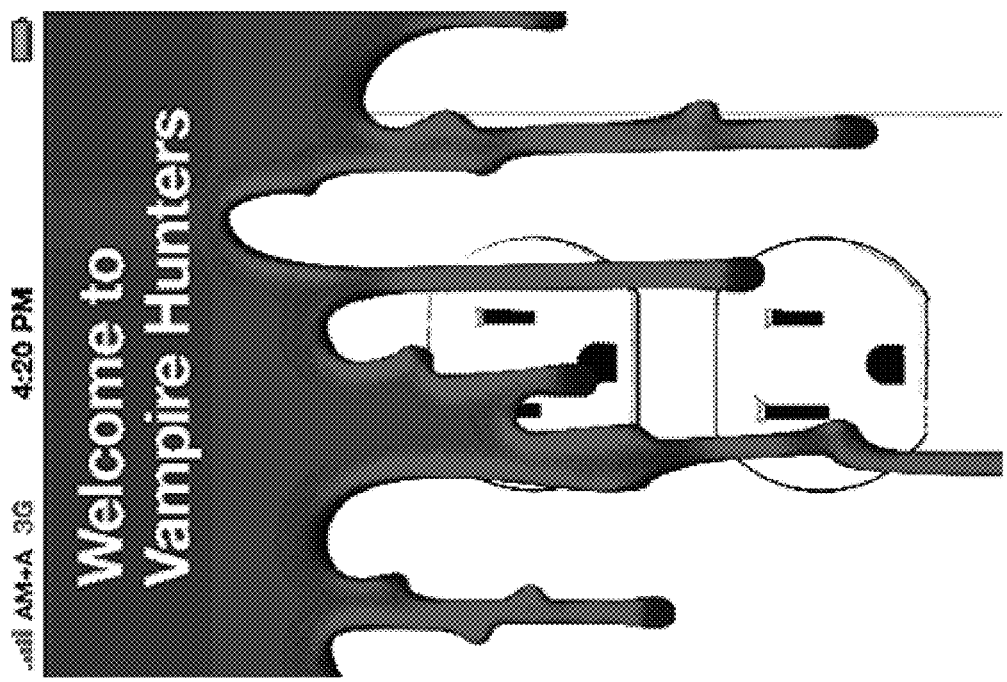
Figures 9C, 9D:
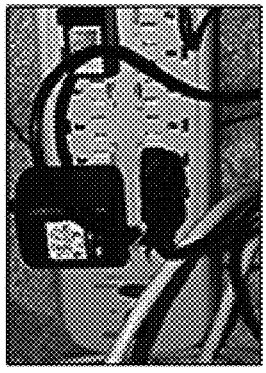

FIGS. 9(a)-9(d) illustrate exemplary initiative interfaces for a vampire hunters initiative according to an embodiment of the present invention. An individual member of the vampire hunters initiative may identify and document energy vampires as they are discovered, the more energy vampires discovered by the member, the more points the member may accrue. An energy vampire may be documented by identifying the location of the energy vampire on a map, uploading a photo of the vampire, or otherwise reporting information that identifies the energy vampire. FIG. 9(a) illustrates an exemplary introduction interface or splash screen for a vampire hunting initiative. FIG. 9(b) illustrates an exemplary visualization of identified vampires. FIG. 9(c) illustrates an exemplary identification and reporting interface as displayed on a client device. FIG. 9(d) illustrates an exemplary interface displaying individual or team scores for a vampire hunters initiative as displayed on a client device.

An initiative member may alternatively organize a team vampire hunter competition such that at a pre-arranged time, members from different subgroups or teams compete to see who can find and document the most vampires, for example, building A against building C or the members of floor 5 against the members of floor 3. The subgroup that identifies the most energy vampires within a specified period of time will be considered the winning team. The points awarded to a member for participating in the initiative may awarded simply for participation in the initiative, based on the member's standing in the initiative leaderboard, or based on the number of unique energy vampires identified by the member.

Image Wall

An image wall may be a stand alone initiative or an action that may be added to an existing initiative. For an image wall, a mosaic may be created of resources including photos and images, quotes, and ideas that users have uploaded that are relevant to the initiative. To create the mosaic, grids with different-sized rectangles may be available and users may choose which resource should be placed in each rectangle. Alternatively, the system may automatically create the resource mosaic with a random placement of resources that may result in a unique quilt effect. In another embodiment, a resource may be restricted to a particular size and shape, and creating the mosaic may be achieved by fitting the resources together as if they were part of a jigsaw puzzle.

A mosaic may be published as a souvenir upon completion of an initiative containing images and comments uploaded for or otherwise related to the initiative, may be added to the initiative post feed or the post feed for participating members, may reflect a work in progress, may be displayed or printed and posted to showcase an initiative and attract more members, or may simply be added to the library of resources stored by the sustainability tracking system.

Establishing and maintaining user interest in the sustainability system goals and activities is addressed by providing incentives that encourage individuals to utilize the features and participate in the activities of the sustainability tracking system. Incentives may be provided competition prompted by published leaderboards and other published action results, published notifications detailing individual accomplishments, or goods and services awarded for user participation in system activities.

Competition may be a strong motivator that encourages participation in sustainability tracking system activities. As previously noted, a user may gain points for each initiative or action participated in, and the award of points may provide an incentive for the individual to participate in new activities. Additionally, an individual member's participation in the sustainability tracking system may be published to the group, either by posting the total number of points acquired over a period of time, or by indicating a point milestone achieved by the user, for example, a participation status of silver may reflect achievement of a point milestone of a predetermined number of points that represents participation levels. Alternatively, according to an embodiment, a silver status may reflect an average participation level whereas a participation status of gold may reflect an above average participation level. The member's participation may additionally be published to third party websites or otherwise transmitted to third parties. For example, the member may choose to publish their accomplishments to a social networking website, such as facebook or twitter, or may choose to send an email to their friends or family to notify them of the accomplishment.

Figure 10A:
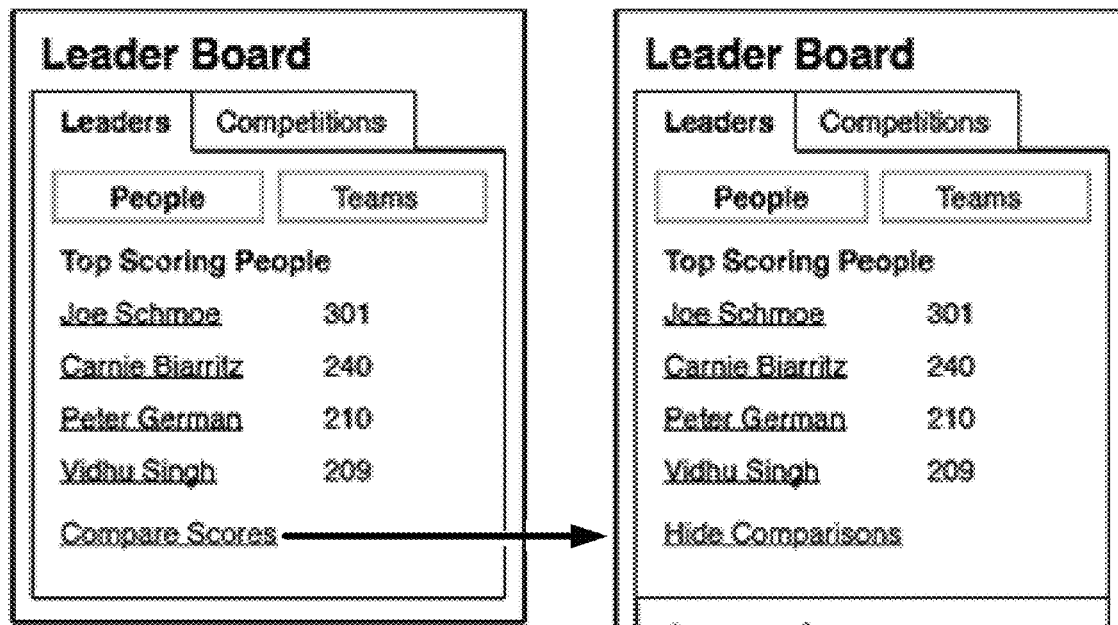
FIGS. 10(a)-10(b) illustrate exemplary leaderboard interfaces according to an embodiment of the present invention.

FIG. 10(a) illustrates an exemplary leaderboard interface that identifies the top point scorers in the group according to an embodiment of the present invention. A group leaderboard may facilitate friendly competition between group members and provide additional motivation to participate in system activities. As shown in FIG. 10(a), individual members may look up and compare their point score to another known member. This may allow members that are not displayed at the top of the leaderboard to compete against their friends and family.

A group leaderboard may be cumulative, indicating the total points accumulated by group members. Or the leaderboard may be periodically reset, every year, quarter, or month for example, to allow new members a chance to achieve notoriety at the top of the leaderboard and encourage competition among members after a subset of members have been at the top of the leaderboard for a period.

Figure 10B:
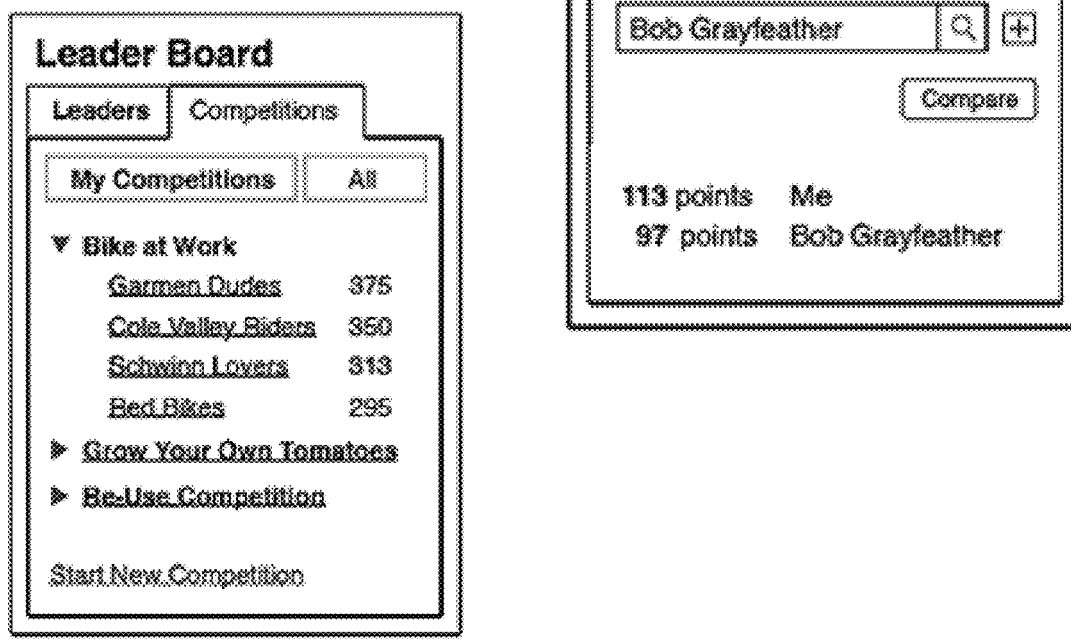

As shown in FIG. 10(b) a leaderboard may be displayed for a subgroup, initiative, or competition. Then the members of a competition, subgroup or initiative may see the leader standings for the subgroup. A system user may see the leaderboards for each subgroup of which they are a member from a single leaderboard interface.

System users may additionally be encouraged to participate in sustainability tracking system activities by providing system content that is often updated and refreshed, consistently providing new and interesting content. Image content displayed on a system homepage or initiative interface, for example, may be pulled from a resource library of helpful links, articles, photos, videos and other information. The resource library may contain pre-loaded resources. Resources may additionally be submitted by group members and added to the resource library. Resources may be promoted or demoted by the group members such that resources with a high ranking, or a ranking above a predetermined threshold, may be displayed more often and resources with a low ranking may be removed from the display rotation.

User specific information may be updated with similar frequency, for example, each time a user participates in a recurring initiative (bike to work for example), the user's activity may be reflected in a dynamically updated map displayed on the initiative page, the system homepage, or the user's profile. This ability to see at a glance which subgroups have the greatest participation may be a source of bragging rights, facilitate friendly competition, and may attract new and repeat users to the sustainability tracking system and the various initiative interfaces. A user might also be encouraged to participate in an initiative if they were notified that multiple members of the user's subgroups were participating in initiative activities.

Figure 11:
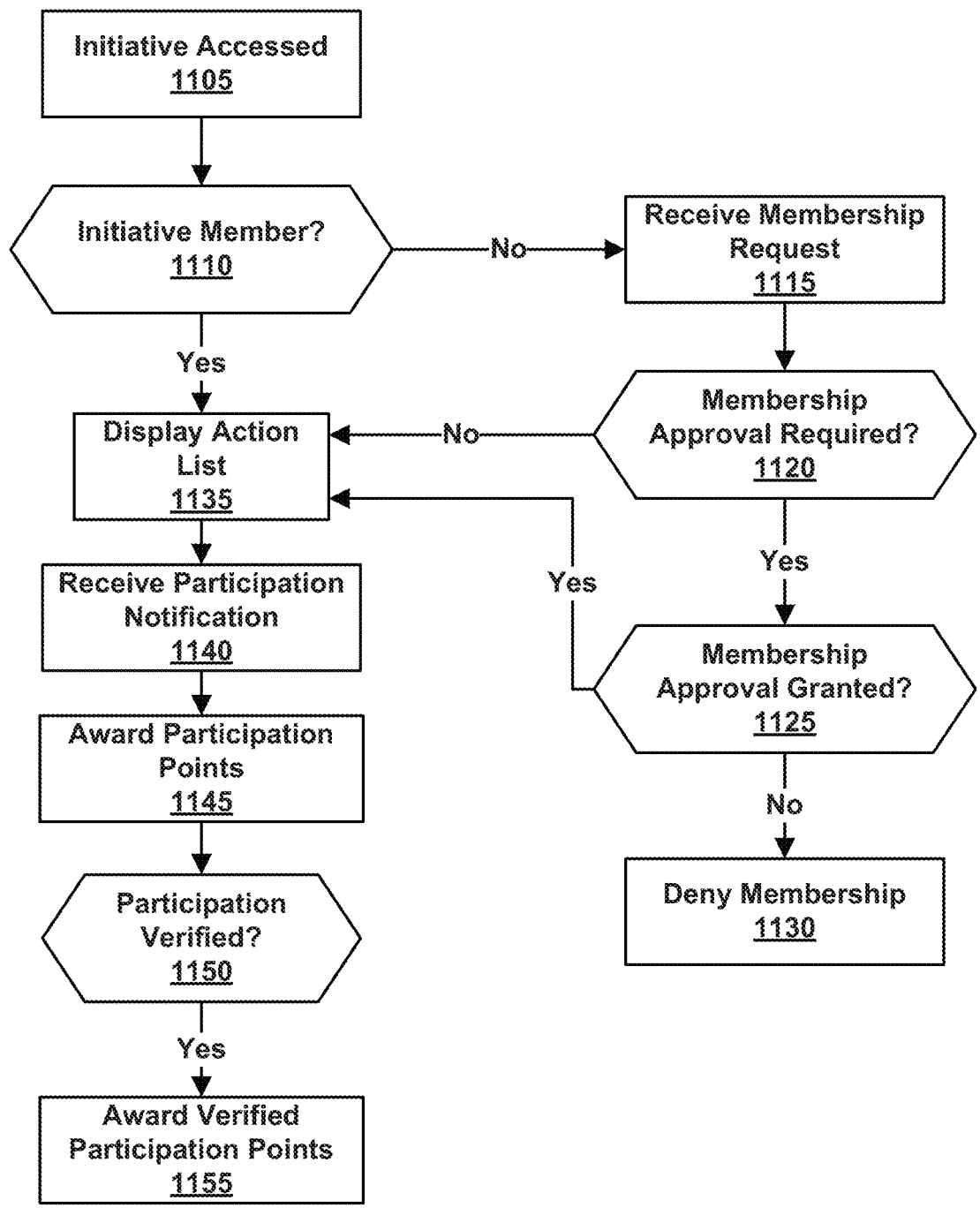
FIG. 11 illustrates an exemplary method for awarding participation points to a system user according to an embodiment of the present invention.

Participation is further encouraged where the points earned for participation initiative activities may be redeemed for rewards. FIG. 11 illustrates an exemplary method for awarding participation points to sustainability tracking system users according to an embodiment of the present invention. To claim participation points, a user may first access the initiative in which they want to report participation (block 1105).

According to an embodiment, a user may only claim participation and receive points from initiatives in which the user is a member. Accordingly, if the user accessing the initiative is not a member (block 1110), the system may prompt for or receive from the user a membership request (block 1115). Upon receiving a membership request, approval by an initiative moderator or system administrator may be required before membership is granted (block 1120). If membership approval is required, and membership is approved (block 1125), the system may add the user to the membership for the initiative record. Membership may be denied (block 1130) for example, if the initiative has reached a maximum capacity, if membership is limited to a closed group of users, a department, building or family for example, or for other reasons.

If an approved member accesses the initiative, the member may additionally access a list of actions in which the member may participate (block 1135). The user may then submit a notification indicating participation in the action (block 1140). Points may then be awarded to the member according to the predefined disbursement rules set by the initiative moderator (block 1145). In accordance with an aspect of an embodiment, the points may be awarded automatically upon submission of the notification, or the points may not be awarded without first receiving approval or verification from the initiative moderator.

According to another aspect, the member may have the option to receive additional points if the member submits verification information with the participation notification. If verification earns the member additional points, and verification is submitted (block 1150), the member may be awarded additional points (block 1155). Verification may include submission of a post or comment containing photographic evidence of participation, submission of a resource that represents a souvenir of the participation, a post by another member commenting on the participation, an attendance list uploaded or confirmed by an action or initiative moderator or other information uploaded to the system. The initiative moderator may restrict the type of submission that will be accepted as verification.

Group members may additionally earn points when an initiative the member actively participates in results in a calculable reduction in related energy usage. This may encourage other users to participate in successful initiatives.

Points may be used as a measure of participation and to encourage friendly competition, as through a leaderboard for example. Additionally, earned points may be redeemed for other rewards. For example, points may be redeemed for coupons, gift certificates, goods or services, or intangible rewards such as time in a premium parking spot or extra hours of paid time off. User profile features or customizable interfaces may additionally be held out as rewards, for example a user may earn the ability to add additional icons, or animations to their profile, to download a game or widget for their client device, or to change their profile and system interface theme.

A system administrator may determine the number of points or the types of awards available to system participants. For example, the system administrator may have a set budget and according to that budget, determine the number and types of awards available to the system users as a whole or specifically to each initiative, the number of points needed to earn specific awards, or the number of points available to each initiative for a period.

Members who create or moderate an initiative, action, or competition may have the ability to set the point distribution for participating members or to identify specific rewards for initiative winners. The moderator may additionally specify reward distribution by identifying reward ranges. Reward ranges may provide rewards to users according to tiers of rewards, and the tiers available for an initiative may be determined by the initiative budget. For example, a member may be able to select an award for participation from a first tier of awards, and a different award for winning a competition from a second tier of awards.

Figure 12:
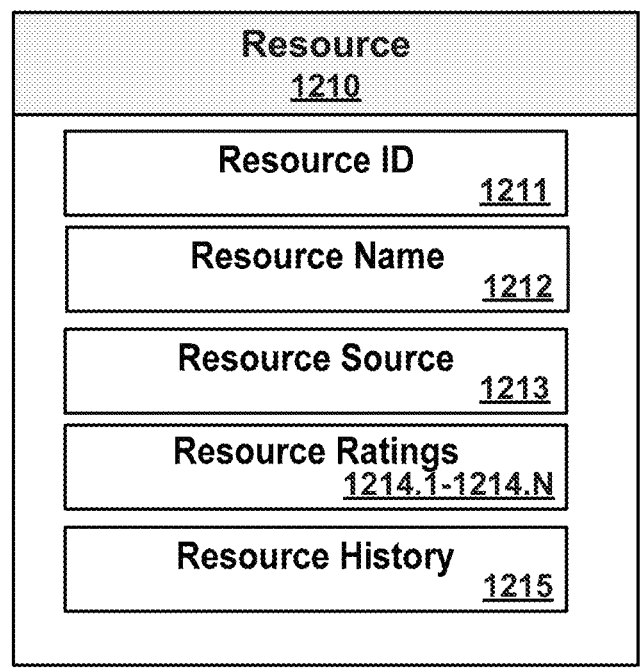
FIG. 12 illustrates an exemplary record for a resource according to an embodiment of the present invention.

User participation in the sustainability tracking system may be further facilitated by ensuring the information provided to the system users comes from a trusted source. To ensure the information presented to users is trustworthy, the sustainability tracking system may maintain a resource library consisting of resources that were either pre-loaded into the sustainability tracking system or uploaded to the sustainability tracking system by trusted group members. FIG. 12 illustrates an exemplary record for a resource 1210 in the sustainability tracking system according to an embodiment of the present invention. As previously noted, resources may include links to valuable online resources, articles, websites, tips related to making changes in behavior relevant to an initiative, video clips and images, or inspiring quotes and other facts or snippets of information.

A resource may include a resource ID 1211 which uniquely identifies the resource in the system and a resource name 1212 which identifies the resource to the system users and may be descriptive of the resource. The resource ID 1211 may be assigned by the system as a unique identifier. The resource name 1212 may be created by the system during resource detection and creation or assigned by a group administrator or initiative moderator. Where applicable, the resource record 1210 may additionally include a pointer to the resource source post or comment 1213 or to the member who originally submitted the source post or comment where applicable. Additionally, the resource record 1210 may include member ratings 1214.1-1214.N for the resource. A new rating 1214 may be created when a user provides feedback rating the source comment or the resource itself. Other related resource history 1215 may be stored with the resource record 1210. For example, a resource may generate significant traffic that may be tracked by the system and associated with the resource record 1210, other resources may be associated with the resource record 1210, or a pointer to the member that submitted the resource or the initiative associated with the resource may be stored as part of the resource record 1210.

Users may rate or rank a resource such that highly rated resources may be displayed more often. Resources may additionally receive a rating based on the number of users viewing the resource, the number of posts linking to the resource, or the number of comments posted about the resource. Through the rating system, a photo or clip of the week may be chosen and displayed. A user who submits a highly rated resource may additionally receive rewards points for submitting high quality or high interest resources. Highly rated resources associated with an initiative may highlight successful initiatives and encourage new members to participate in a featured initiative.

Figure 13:
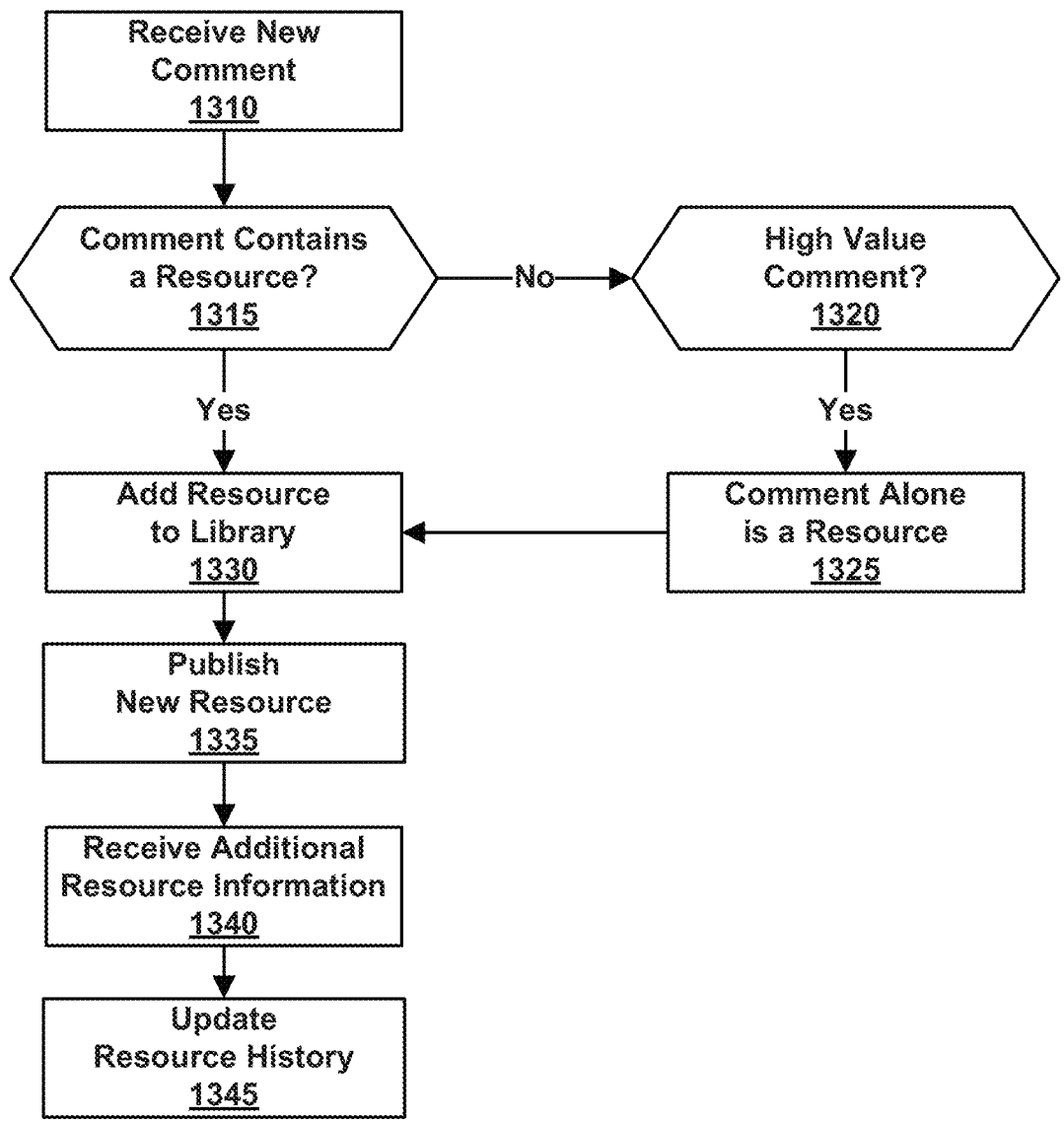
FIG. 13 illustrates an exemplary method for identifying a submitted resource according to an embodiment of the present invention.

Resources may be identified and tracked or stored in a resource library. FIG. 13 illustrates an exemplary method for identifying a submitted resource according to an embodiment of the present invention. For example, a user may submit a comment updating a post feed, a notification of participation, or some other submission to the system (block 1310). The system may receive the comment or notification and parse the submission to identify any submitted resources (block 1315). As previously noted, a resource may include photos and videos, informative articles, links to relevant products or websites, sustainability tips, quotes, or other facts or snippets of information. If the comment does not include a resource, the comment itself may be considered a resource. However, not all comments are considered resources. A comment may be considered a resource for any of several reasons, for example if it generates a significant amount of traffic or click-throughs, if it receives a significant number of or predetermined number of comments, if a predetermined number of members link to the comment in another post or comment, or if the comment receives consistently positive ratings (blocks 1320, 1325).

An identified resource may then be stored in the resource library (block 1330). Resources in the resource library may be published and made viewable to the users of the sustainability tracking system (block 1335). Resources may be displayed to users throughout the system, for example on the system homepage, on a user profile page, on an initiative page, or in an update message. Additionally, a user may search the resource library for published resources. Then, resources that have received positive reviews, or that are informative on a sustainability topic may be accessed on demand at the user's convenience.

Additional information related to a previously published resource may be tracked by the sustainability tracking system (block 1340). For example, the comments and traffic generated by the resource may be stored or tracked, the ratings for the resource may be stored or tracked, or a subsequent submission that may directly update, confirm, or contradict the resource may be stored or tracked. Upon submission of additional information, resources stored in the resource library may then be updated as appropriate (block 1345). The new information or a pointer to the new information stored in the system may then be stored with the resource.

Thus the sustainability tracking system may automatically track documents, images and links shared by members of the group, and create a repository. The resources may be organized by subgroup or initiative as applicable. Users may access and search the resource library through a resource library interface, or may be organized and browse-able by group, subgroup, or initiative. Thus users do not have to keep track of interesting and informative resources on their own, but can access them at any time. As a user becomes familiar with the concepts advanced by the sustainability tracking system, easy and reliable access to information may improve the user experience, may enhance the user's trust in the sustainability tracking system, and may encourage participation in sustainability tracking system initiatives and actions.

Additional exemplary resources may include a 3-D map of a group's buildings or campuses with areas glowing with different intensity according to current or recent or historic power usage or hotspots mapped to a floor plan. Similarly, real time images could be captured as a time-lapse video over the course of a day and saved to the system, so that users may access such visualizations via their sustainability tracking system membership. Such a resource may generate data visualizations comparing usage by different subgroups or individuals as well as showing usage over time.

Additionally, the inherent untrustworthiness of a self reported system may be remedied by encouraging verification activities. As previously noted, verification may include approval by an administrator or moderator, submission of a verifying post by a second user, or submission of a resource that evidences the user's participation in the action. An evidentiary post or resource may include a photo of the user participating in the action, a comment from a user congratulating the member on a successful action, or a submission of location based information from recent GPS activity as recorded on the member's mobile client indicating the member's movements or position during event participation. Verified participation may be worth more points than a self-reported participation that was not verified.

The group may additionally be self-policed, as part of the rating system, members may flag other members or posts or initiatives as inappropriate or questionable. A system administrator or initiative moderator may then take steps to either verify the questionable post or restrict posting access and rewards for certain members.

Initially, users may be more likely to participate in sustainability tracking system initiatives if participation in the initiatives easily fits within their lifestyle. Then, once a user is an active participant, the previously discussed incentives may encourage further participation. To make participation simple, sustainability tracking system access and initiative participation may be achieved from a variety of easy to use platforms. For example, through a webpage accessible via the Internet, through a client application running on the user's system and connected to a group's Intranet, or through an application installed on a mobile device. Access from each of the various platforms may be intuitive and switching between platforms may be seamless.

For example, users may quickly access their profile and active initiatives from a handheld mobile device. Then a user may upload photos, update their post feed, or submit a participation notification from the mobile device. Participation may be recorded during an action or event or immediately following completion of an action. Thus, the user need not log-on and provide updates from a specific client device or at a specific time that may occur long after the action has been completed. Immediate access to the system features from multiple different devices also may provide an opportunity to advertise actions as they are occurring. Then local members may observe posts related to the action in real time and join fellow members in participating in the action.

A sustainability tracking system user may receive updates and notifications through a variety of communication methods, for example, a user may receive a periodic update email listing the top 10 most popular initiatives in the sustainability tracking system, a description highlighting any new initiatives created in the sustainability tracking system, new actions available for the user's subscribed initiatives, upcoming competitions, as well as the leaderboard for the group or for individual initiatives. The periodic update may be sent weekly, daily, monthly, or quarterly, or not at all according to the user's preferences. Additionally, a user may receive notifications, for example a pop up or an SMS message that provides notice when an initiative in which the user has membership has an upcoming competition or action for which the member has indicated an interest in participating.

Although the disclosed embodiments discuss a sustainability tracking system, in some implementations, the features disclosed herein may be applicable to other systems that encourage individual member participation, facilitate the growth of trust in the system, provide flexible methods for interacting with the system and user input, and are implemented on an organization level.

The foregoing discussion identifies platforms and devices that may be used by users of a sustainability tracking system constructed according to various embodiments of the present invention. In practice, this system may be applied in a variety of devices, such as personal computing systems and/or mobile devices. In some applications, the modules described hereinabove may be provided as elements of an integrated software system, in which the blocks may be provided as separate elements of a computer program. Some embodiments may be implemented, for example, using a computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Such implementation details are immaterial to the operation of the present invention unless otherwise noted above.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A sustainability tracking system comprising:
a memory for storing a plurality of resources, wherein a stored resource from the plurality of stored resources is one of a link to an online story, an article, a web site, a tip related to using the system, a video clip, an image, an inspiring quote, or a fact related to sustainability; and
a processor configured to receive a comment submitted by a system user, to identify a resource submitted with the received comment, and to select the stored resource from the plurality of stored resources for publication to a plurality of system users;
wherein the identified resource is stored in the memory;
wherein the received comment relates to an established sustainability initiative approved by a system administrator, the established sustainability initiative comprising an initiative record, wherein the initiative record includes a pointer to at least one of the plurality of stored resources, an initiative identification, an initiative name, and an initiative reward;
wherein the system user receives participation points for submitting the received comment based on the initiative reward; and
wherein the stored resource is selected for publication if the identified resource is from a trusted source and has received a predetermined minimum feedback from the plurality of system users and wherein the predetermined minimum feedback includes at least one of a predetermined number of comments, a predetermined number of linked system users of the plurality of system users, and a plurality of positively rated comments.

2. The system of claim 1, wherein the identified resource is from the trusted source if the system user that submitted the received comment is a known system user.

3. The system of claim 1, wherein the identified resource is from the trusted source if the system user that submitted the received comment is an invited system user.

4. The system of claim 1, wherein the identified resource is from the trusted source if it is submitted by more than one system user.

5. The system of claim 1, wherein the identified resource is from the trusted source if it is approved by a system administrator.

6. The system of claim 1, wherein the identified resource is from the trusted source if a verification comment is received at the processor.

7. The system of claim 6, wherein the verification comment is a subsequent comment to the received comment that provides proof of a trustworthiness of the received comment based on the verification comment matching the stored resource.

8. The system of claim 6, wherein the verification comment is a comment from a first system user forwarding the identified resource to a second system user.

9. The system of claim 6, wherein the verification comment is the subsequent comment to the received comment that positively reviews the resource.

10. The system of claim 1, wherein the subsequent comment to the received comment is related to the identified resource is identified by the processor and stored in memory with the identified resource.

11. The system of claim 1, wherein the received comment is the identified resource.

12. The system of claim 1, wherein the processor assigns a ranking to each stored resource and wherein the assigned ranking determines if the stored resource is displayed to the system user via a graphical user interface.

13. The system of claim 12, wherein the assigned ranking is based at least in part on a trustworthiness of the system user that submitted the identified resource.

14. The system of claim 12, wherein the assigned ranking is based at least in part on the subsequent comment to the received comment related to the identified resource received at the processor.

15. The system of claim 12, wherein the assigned ranking is based at least in part on feedback from system users viewing the identified resource.

16. The system of claim 12, wherein the identified resource is selected for publication only if the assigned ranking is above a predetermined threshold.

17. A sustainability tracking system for ensuring displayed information is from trusted sources comprising:
- a memory that stores a plurality of resources for display, wherein a stored resource of the plurality of stored resources is one of a link to an online story, an article, a website, a tip related to using the system, a video clip, an image, an inspiring quotes, or a face related to sustainability;
- a server connected to a network, the server configured to:
  - receive a comment from a system user of a sustainability tracking system via the network, wherein the received comment relates an established sustainability initiative approved by a system administrator, the established sustainability initiative comprising an initiative record, wherein the initiative record includes a pointer to at least one of the plurality of stored resources, an initiative identification, an initiative name, and an initiative reward, wherein the system user receives participation points for submitting the received comment based on the initiative reward; and
  - transmit elements for display to a client device associated with the system user of the sustainability tracking system via the network; and
- a controller configured to:
  - identify a resource received with the received comment,
  - store the identified resource in the memory; and
  - select the stored resource from the plurality of stored resources as an element for display, wherein the selected stored resource is from a trusted source and has received a predetermined minimum feedback from a plurality of system users and wherein the predetermined minimum feedback is at least one of a predetermined number of comments, a predetermined number of linked system users of the plurality of system users, and a plurality of positively rated comments.

18. The system of claim 17, wherein the identified resource is from the trusted source if the system user that submitted the received comment is a known system user.

19. The system of claim 17, wherein the identified resource is from the trusted source if a verification comment is received at the processor.

20. The system of claim 17, wherein the processor is further configured to assign a rank to each stored resource and wherein the assigned rank determines if the stored resource is displayed to the system user via a graphical user interface.

21. The system of claim 20, wherein the assigned rank is based on a subsequent comment to the received comment related to the identified resource received at the processor.

22. The system of claim 20, wherein the assigned rank is based on feedback from system users viewing the identified resource.

23. The system of claim 20, wherein the controller selects the identified resource as an element for display only if the rank assigned to the identified resource is above a predetermined threshold.

24. A computer implemented method for collecting resources from trusted sources for sustainability tracking, the method comprising:
- receiving at a processor a comment submitted by a system user, wherein the received comment relates to an established sustainability initiative approved by a system administrator, the established sustainability initiative comprising an initiative record, wherein the initiative record includes a pointer to at least one of the plurality of stored resources, an initiative identification, an initiative name, and an initiative reward, wherein the system user receives participation points for submitting the received comment based on the initiative reward;
- parsing the received comment at the processor to identify a resource, wherein the identified resource is one of a link to an online story, an article, a website, a tip related to using the system, a video clip, an image, an inspiring quote, or a fact related to sustainability;
- assigning a rank to the identified resource based on input from at least one system user, wherein the identified resource with an assigned rank above a predetermined threshold will be available to the system user and wherein the predetermined threshold includes at least one of a predetermined number of comments, a predetermined number of linked system users of the plurality of system users, and a plurality of positively rated comments; and
- storing the identified resource and associated rank in a resource repository on a non-transitory computer readable medium.

25. The method of claim 24, wherein the received comment is the identified resource.

26. The method of claim 24, wherein the assigning further comprises adjusting the assigned rank based on a trustworthiness of the user.

27. The method of claim 24, wherein the assigning further comprises adjusting the assigned rank based on subsequent comments to the received comment related to the received comment.

28. The method of claim 24, wherein the assigning further comprises adjusting the assigned rank based on other comments related to the identified resource.

29. The method of claim 24, wherein the assigning further comprises adjusting the assigned rank based on feedback from system users viewing the identified resource.

30. A computer implemented sustainability tracking method comprising:
- storing a plurality of resources in a non-transitory memory, wherein a stored resource of the plurality of stored resources is one of a link to an online story, an article, a web site, a tip related to using the system, a video clip, an image, an inspiring quote, or a fact related to sustainability;

receiving at a processor a comment submitted by a system user, wherein the received comment relates to an established sustainability initiative approved by a system administrator, the established sustainability initiative comprising an initiative record, wherein the initiative record includes a pointer to at least one of the plurality of stored resources, an initiative identification, an initiative name, and an initiative reward, wherein the system user receives participation points for submitting the received comment based on the initiative reward;

identifying with the processor a resource submitted with the received comment;

storing the identified resource in the memory;

selecting with the processor the stored resource from the plurality of stored resources for publication to system users;

wherein the stored resource is selected for publication if the identified resource is from a trusted source and has received a predetermined minimum feedback from a plurality of system users and wherein the predetermined minimum feedback includes at least one of a predetermined number of comments, a predetermined number of linked system users of the plurality of system users, and a plurality of positively rated comments.

31. The method of claim 30, wherein the identified resource is from the trusted source if the system user that submitted the received comment is a known system user.

32. The method of claim 30, wherein the identified resource is from the trusted source if a verification comment is received at the processor.

33. The method of claim 30, further comprising:
identifying with the processor a subsequent comment to the received comment related to the identified resource; and
storing the subsequent comment to the received comment in memory with the identified resource.

34. The method of claim 30, further comprising assigning a rank to each stored resource and wherein the assigned ranking determines if the stored resource is displayed to the system user via a graphical user interface.

35. The method of claim 34, wherein the selecting includes determining the assigned rank for the stored resource is above a predetermined threshold.

36. A non-transitory computer-readable medium encoded with instructions that when executed causes a processor to perform a sustainability tracking method comprising:
upon receiving at the process a comment submitted by a system user, parsing the received comment to identify a resource, wherein the identified resource is one of a link to an online story, an article, a website, a tip related to using the system, a video clip, an image, an inspiring quote, or a fact related to sustainability and wherein the received comment relates to an established sustainability initiative approved by a system administrator, the established sustainability initiative comprising an initiative record, wherein the initiative record includes a pointer to at least one of the plurality of stored resources, an initiative identification, an initiative name, and an initiative reward, wherein the system user receives participation points for submitting the received comment based on the initiative reward;
assigning a rank to the identified resource based on input from at least one system user, wherein resources with an assigned rank above a predetermined threshold will be available to the system user and wherein the predetermined threshold includes at least one of a predetermined number of comments, a predetermined number of linked system users of the plurality of system users, and a plurality of positively rated comments; and
storing the identified resource and associated rank in a resource repository on a non-transitory computer readable medium.

37. A non-transitory computer-readable medium encoded with instructions that when executed causes a processor to perform a sustainability tracking method comprising:
upon receiving a comment submitted by a system user, identifying a resource submitted with the received comment, wherein the identified resource is one of a link to an online story, an article, a website, a tip related to using the system, a video clip, an image, an inspiring quote, or a fact related to sustainability and wherein the received comment relates to an established sustainability initiative approved by a system administrator, the established sustainability initiative comprising an initiative record, wherein the initiative record includes a pointer to at least one of the plurality of stored resources, an initiative identification, an initiative name, and an initiative reward, wherein the system user receives participation points for submitting the received comment based on the initiative reward;
storing the identified resource in memory; and
selecting a stored resource from a plurality of stored resources for publication to system users;
wherein the stored resource is selected for publication if the identified resource is from a trusted source and has received a predetermined minimum feedback from a plurality of system users and wherein the predetermined minimum feedback includes at least one of a predetermined number of comments, a predetermined number of linked system users of the plurality of system users, and a plurality of positively rated comments.

* * * * *